United States Patent [19]

Breen et al.

[11] Patent Number: 4,570,229

[45] Date of Patent: Feb. 11, 1986

[54] TABLET PRESS CONTROLLER AND METHOD

[75] Inventors: David T. Breen, North Wales, Pa.; Howard F. Burghdurf, Jr., Sparta, N.J.; Curtis Huff, Gaithersburg, Md.

[73] Assignee: Pennwalt Corporation, Philadelphia, Pa.

[21] Appl. No.: 533,692

[22] Filed: Sep. 19, 1983

[51] Int. Cl.⁴ .......................... G06F 15/46; B29C 3/06

[52] U.S. Cl. .................................. 364/476; 264/40.1; 425/149

[58] Field of Search ........................ 364/473, 476, 552; 425/149, 167, 170, 171, 145; 264/40.1, 40.5, 120, 239, 109, 40.4; 377/6, 13, 15, 16, 19

[56] References Cited

U.S. PATENT DOCUMENTS

| | | | |
|---|---|---|---|
| Re. 30,319 | 7/1980 | Crossley et al. | 425/345 |
| 2,992,729 | 7/1961 | Curtius | 425/165 X |
| 3,255,716 | 6/1966 | Knoechel et al. | 425/170 X |
| 3,389,432 | 6/1968 | Griesheimer et al. | 425/170 |
| 3,507,388 | 4/1970 | Furtwaengler et al. | 209/79 |
| 3,525,382 | 8/1970 | Devol | 425/139 X |
| 3,579,217 | 5/1971 | Casey et al. | 324/103 X |
| 3,597,794 | 8/1971 | Mann | 324/73 |
| 3,677,673 | 7/1972 | Shapiro | 425/78 |
| 3,734,663 | 5/1973 | Holm | 425/147 |
| 3,741,699 | 6/1973 | Arpajian et al. | 425/149 |
| 3,741,700 | 6/1973 | Hutchinson et al. | 425/159 |
| 3,819,774 | 6/1974 | Eggenberger et al. | 425/149 X |
| 3,836,299 | 9/1974 | Houston et al. | 425/128 |
| 3,875,383 | 4/1975 | Somerville et al. | 425/141 X |
| 3,881,651 | 5/1975 | Wilhelm, Jr. | 425/140 X |
| 3,890,413 | 6/1975 | Peterson | 425/78 X |
| 3,891,375 | 6/1975 | Pilewski et al. | 425/344 |
| 3,910,737 | 10/1975 | Shimada et al. | 425/140 |
| 3,918,873 | 11/1975 | Crossley et al. | 425/345 |
| 3,933,032 | 1/1976 | Tschoegl | 73/575 X |
| 3,982,865 | 9/1976 | Adams et al. | 425/149 |
| 4,000,231 | 12/1976 | Peterson | 425/356 |
| 4,014,634 | 3/1977 | Hoshino | 425/78 |
| 4,030,868 | 6/1977 | Williams | 425/149 |
| 4,047,866 | 9/1977 | Shah | 425/107 |
| 4,062,914 | 12/1977 | Hinzpeter | 264/40.1 |
| 4,099,239 | 6/1978 | Williams | 364/552 |
| 4,100,598 | 7/1978 | Stiel et al. | 364/476 |
| 4,104,014 | 8/1978 | Pearce | 425/345 |
| 4,121,289 | 10/1978 | Stiel | 364/552 |
| 4,145,174 | 3/1979 | Goloskov et al. | 425/78 |
| 4,199,539 | 4/1980 | von Herrmann et al. | 264/0.5 |
| 4,238,431 | 12/1980 | Stuben et al. | 425/149 X |
| 4,240,996 | 12/1980 | Hunkar | 264/40.1 |
| 4,292,017 | 9/1981 | Doepel | 425/107 |
| 4,317,649 | 3/1982 | Boellmann | 425/150 |
| 4,396,564 | 8/1983 | Stuben et al. | 264/40.5 |
| 4,452,579 | 6/1984 | Janson | 425/149 X |

FOREIGN PATENT DOCUMENTS

| | | |
|---|---|---|
| 1040274 | of 1966 | United Kingdom . |
| 1143699 | of 1969 | United Kingdom . |
| 1216397 | of 1970 | United Kingdom . |
| 1369788 | of 1974 | United Kingdom . |

OTHER PUBLICATIONS

*The Physics of Tablet Compression,* III, Design and Construction of an Instrumented Tableting Machine, by T. Higuchi, Eino Nelson, and L. W. Busse; Journal of the American Pharmaceutical Association, vol. XLIII, No. 6.

*Instrumented Rotary Tablet Machines,* I, Design, Construction, and Performance as Pharmaceutical Research and Development Tools, by E. L. Knoechel, C. C. Sperry, H. E. Ross, and C. J. Lintner; Journal of Pharmaceutical Sciences, vol. 56, No. 1, Jan. 1967.

*Aspects of Pharmaceutical Engineering,* Automatic Control of Tablet Weight, The Pharmaceutical Journal, Mar. 24, 1973, by K. Ridgway.

*Primary Examiner*—Joseph Ruggiero

*Attorney, Agent, or Firm*—Seidel, Gonda, Goldhammer & Abbott

[57] ABSTRACT

A tablet press controller comprises means for receiving and monitoring a compression signal and providing a data word having a value indicative of the magnitude of the compression signal, data processing means for reading the data word and processing the data word in a pre-established manner, including detecting if the value of the data word exceeds or fails to exceed pre-established limits, and providing tablet press control signals for controlling the operation of the tablet press, including control signals for adjusting the level of powder fill in die cavities, control signals for activating divert gates for rejecting tablets, and signals generated in response to the occurence of one or more undesired vents for shutting down the tablet press.

46 Claims, 19 Drawing Figures

TABLET PRESS CONTROLLER AND METHOD

BACKGROUND OF THE INVENTION

The present invention relates generally to control apparatus for tablet press machinery. More particularly, the invention relates to a control apparatus for measuring compression forces associated with tablet formation, monitoring tableting events such as counting the number of tablets which have been formed by the tablet press, and using this information to control the operation of the press. The invention has particular application to, but is not limited to, a double sided rotary tablet press.

It is known to measure compression forces in the force applying member of a rotary tablet press using electrical circuitry such as strain gauges. See, for example, U.S. Pat. No. 3,255,716 to Knoechel. Knoechel also teaches control circuitry responsive to a compression force signal derived from the strain gauges for adjusting the level of powder fill in the die cavities. It is also known to use a compression force signal to divert "bad" tablets, shut down the tablet press, compute average compression forces and maintain a count of the number of tablets produced by the tablet press. See U.S. Pat. Nos. 3,507,388 to Furtwaengler et. al., 3,389,432 to Griesheimer et. al. 4,238,431 to Stuben et al, 4,062,914 to Hinzpeter, 4,100,598 and 4,121,289 to Stiel, and 4,030,868 to Williams. See also, British Pat. No. 1,216,397 to Marshall (published Dec. 23, 1970).

As is known in the tablet press control art, it is desirable to record the peak compression force applied to powder fill in a die cavity and use this information to produce control signals for effecting the operation of the press. A problem with prior art tablet press controllers is that they do not record the peak compression force with repeated reliability and therefore they are inaccurate. Moreover, known controllers are limited in the number and type of control signals which they can generate and provide to the tablet press. Still further, prior art controllers are cumbersome, expensive and difficult to set up and maintain.

It is therefore desirable to provide a tablet press controller which is highly accurate and is extremely versatile in the type and number of control signals which it can provide to the press. It is also desirable to provide a tablet press controller which is relatively inexpensive, reliable and easy to operate.

SUMMARY OF THE INVENTION

A controller for a tablet press comprises monitor means for receiving and monitoring a compression signal and providing a data word having a value indicative of the magnitude of the compression signal, data processing means for reading the data word and processing the data word in pre-established manner, including detecting if the value of the data word exceeds or fails to exceed pre-established limits, and providing tablet press control signals for controlling the operation of the tablet press, including control signals for adjusting the level of powder fill in the die cavities, control signals for activating divert gates for rejecting tablets, and signals generated in response to the occurence of one or more undesired events for shutting down the tablet press.

An important feature of the invention is that the monitor means continuously monitors the compression signal and continuously provides, during at least the time a quantity of powder fill is undergoing compression, a data word having a value which continuously tracks the compression signal. The data word is an N bit digital word which has a value relative to upper and lower "alarm" limits set by the operator, where N is an integer greater than 3. Latch means associated with the monitor means latches the highest value data word provided by the monitor means. The data word held by the latch means is read by the data processing means only after it has received a signal from a proximity probe associated with the tablet press, which signal is an indication that the maximum compression force has been applied to the powder fill. In this manner, it is insured that data word read by the data processing means corresponds to the peak of the compression signal.

Another important aspect of the invention is that the controller provides a dynamic histogram-like display of the range of compression forces applied to the powder fill in each of the die cavities during the preceeding revolution of the press. The histogram-like display has N class intervals bounded by the alarm limits.

Other features of the invention include means for incrementally adjusting the powder fill level in the die cavities when the average value of the data words either exceeds or fails to exceed programmable "alert" limits set by the operator, means for diverting a tablet when the value of a data word exceeds or fails to exceed the "alarm" limits set by the operator, means for counting the number of tablets formed by the tablet press, and providing a control signal for activating a divert gate when the tablet count reaches an operator selectable batch count, means for counting the number of "bad" tablets formed by the tablet press (i.e., tablets falling outside of the "alarm" limits set by the operator) and providing a control signal for shutting down the tablet press after the count of the number of "bad" tablets has reached a predetermined count, and means for signalling the data processing means that a selected one or more punches in the press are missing so that the data processing means will not process the signals associated with those punches.

A method for operating the tablet press and for setting operating limits (i.e., "alert" and "alarm" limits) is also disclosed.

Other features of the invention are also disclosed herein.

DETAILED DESCRIPTION OF THE INVENTION CONSTRUCTION

Figure 1:
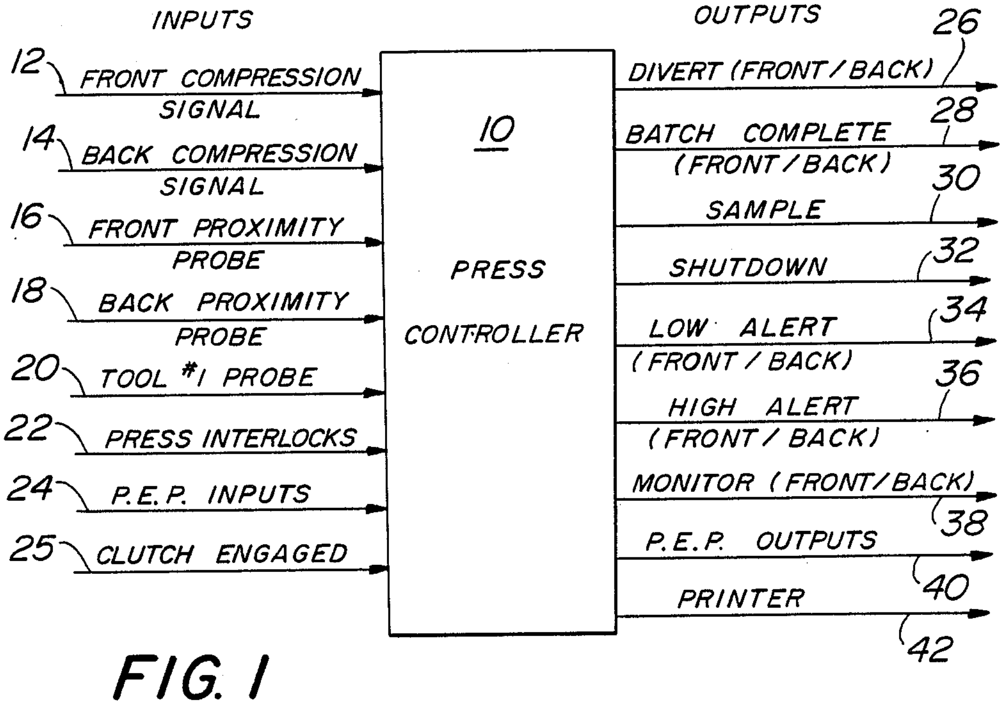
FIG. 1 illustrates the signal inputs to and outputs from a controller according to the present invention.

Referring now to the drawings, therein like numerals represent like elements, there is shown in FIG. 1 a simplified block diagram of a press controller labelled generally 10. As seen, the press controller 10 has a plurality of inputs 12–25 and a plurality of outputs 26–42. Specifically, signals 12 and 14 are compression force signals from the tablet press which are generated in a well-known manner. For example, as taught in U.S. Pat. No. 3,255,716 to Knoechel et. al., a rotary press having a plurality of die/punch combinations has a strain gauge in a force applying member. The strain gauge provides a sinusoidal compression force signal which has a magnitude continuously indicative of the magnitude of the compression force applied to the powder fill in the die cavities.

The disclosed invention has specific application to a double-sided rotary tablet press, and therefore has inputs for both a front compression signal 12 and a back compression signal 14. It should be understood, however, that the present invention is not limited to double-sided rotary presses, but also has application to single-sided rotary presses and single punch presses.

Input signals 16, 18 and 20 are provided by proximity probes associated with the tablet press. Input signal 16 is generated by a proximity probe 54 associated with the front compression station 50 and input signal 18 is generated by a proximity probe associated with the back compression station (not shown). As will be explained in detail hereinafter, each of the front and back proximity probes provide a pulse each time a die/punch combination passes through its respective compression station.

A tool no. 1 probe signal 20 is generated by a third proximity probe 56 associated with the tablet press. As will be explained hereinafter, this probe provides a pulse to the press controller 10 each time metal tag 58 rotates past this proximity probe. Thus, the signal from the tool no. 1 proximity probe is a synchronizing signal which indicates that the press has just completed a full revolution.

The press interlock inputs 22, although shown as only a single input, may comprise a plurality of inputs. The press interlock signals 22 may be either logic level inputs ("1" or "0") or switch contacts which change from a first state (e.g. "closed") to a second state (e.g. "open") upon the occurrence of an undesirable event in the tablet press. For example, one of the interlocks may be associated with a thermocouple on the main bearing of press drive motor. That interlock signal may change from a "closed" state to an "open" state if the motor bearing temperature exceeds a maximum acceptable level. Other interlock signals may be associated with housing doors (i.e. a signal which changes state when an access door is opened), etc., as desired.

A keyboard is connected to the press controller 10 through inputs 24. Although only a single input is shown, it should be understood that input 24 comprises a plurality of inputs for connection of the keyboard to the controller. In a preferred embodiment, the keyboard is the touch sensitive switches on a Peripheral Entry Panel (PEP) such as that manufactured by Industrial Electronic Engineers, Inc., Van Nuys, Calif.

The clutch engaged signal 25 provides an indication to the controller 10 that the press clutch is engaged.

Divert output 26 is shown as comprising only a single output, but it should be understood that in the disclosed embodiment there are two divert outputs 26; a front divert output for the front press and a back divert output for the back press. As will be explained hereinafter, the divert signals 26 are provided to actuate divert gates associated with the tablet press. As is well-known, the divert gates are used to divert one or more tablets so that the diverted tablets are directed to a different collection bin than the non-diverted tablets. See, e.g., U.S. Pat. No. 3,507,388 to Furtwaengler et. al. and U.S. Pat. No. 2,839,252 to Hall.

Batch complete output 28, although shown as only a single output, also comprises two outputs; a front batch complete signal and a back batch complete signal. As will be explained hereinafter, the batch complete signals are provided by the press controller 10 when the number of tablets manufactured reaches a "batch count" set by the operator. The status of the batch complete output alternates each time new a batch count is reached, i.e., it changes from high to low to high, etc. each time a new batch is completed. The batch complete outputs are "user selectable" in that they may be connected to the tablet press to perform one of a desired number of functions. Typically, the batch complete outputs are used to operate divert gates to cause tablets to be collected in a different collection bin each time a batch complete signal occurs. Thus, a divert gate operated by the batch complete output would "flip/flop" during operation of the press, i.e. change state each time a batch count is reached.

Sample output 30 is provided by the press controller 10 during a "sample mode" which will be explained hereinafter. The sample output activates a divert gate during selected revolutions of the tablet press so that tablets are diverted from a main collection bin to a sample bin during the selected revolutions. This feature is particularly useful in quality control applications where it is desired to sample the quality of manufactured tablets during the manufacturing process.

Low alert output 34 is shown as a single output, but it should be understood that there are two low alert outputs; a front low alert output, and a back low alert output. Likewise, the high alert output 36 also comprises a front high alert output and a back high alert output. Outputs 34 and 36 are provided by the press controller 10 to adjust the level of powder fill in the die cavities, as as taught, for example, in U.S. Pat. No. 3,734,663 to Holm. When the controller 10 detects that the average value of the data word associated with the front press has exceeded the "high alert limit", a pulse is provided on the front high alert output 36. If the average value of the data words associated with the front press fails to exceed a "low alert limit", a pulse is provided on the front low alert output 34. The back high and low alert outputs are operable in identical fashion. As will be explained hereinafter, the "alert" pulses will be provided until the average value of the data words falls substantially within the center of the operating band set by the operator.

Monitor output 38 is shown as a single output, but it should be understood that there are two outputs, a front monitor output and a back monitor output. As will be explained in detail hereinafter, the monitor output signal 38 is provided during a "monitor mode" of the press controller 10. Setting of the high and low alert limits, high and low alarm limits, batch count and other operating parameters is performed during the "monitor mode". Tablets produced in the "monitor mode" are therefore not "production run" tablets and thus the monitor output is used to divert all tablets manufactured during the monitor mode to a separate bin.

The PEP output 40, although shown as a single output, is a plurality of outputs which are supplied to the display portion of the PEP panel. As will become evident hereinafter, this display includes the dynamic histogram-like representation of the distribution of the compression forces and the display of other tableting parameters such as the high and low alert and alarm limits.

A plurality of printer outputs 42 are provided to a printer associated with the press controller 10 for providing permanent print-out of tableting data such as the number of tablets produced during a production run, the time when that production run was completed, and other control information pertinent to a production run. The printout also provides a hard copy print-out of a histogram showing the distribution of compression forces between the high and low alarm limits.

Figure 4:
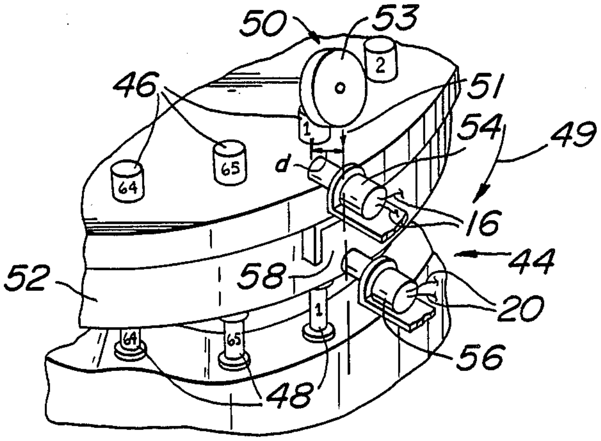
FIG. 4 is a partial perspective view of a rotary tablet press having a plurality of die/punch combinations and illustrates the relative placement of proximity probes used in connection with the controller.
Figure 5:
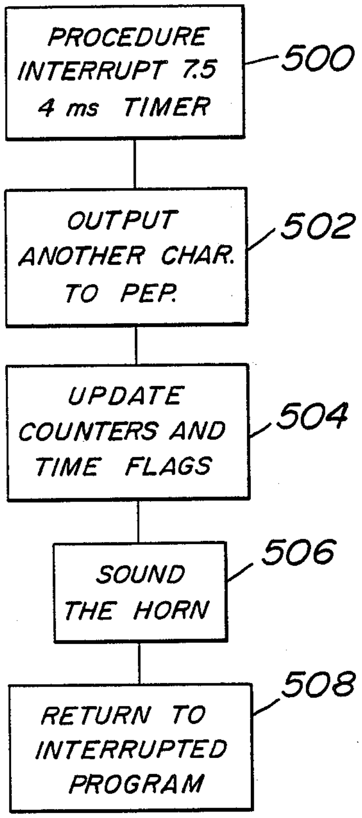
FIGS. 5, 6, 7A, 7B, 8A, 8B, 9A, and 9B are flow diagrams illustrating the operation of software associated with the controller.
Figures 10, 11, 12:
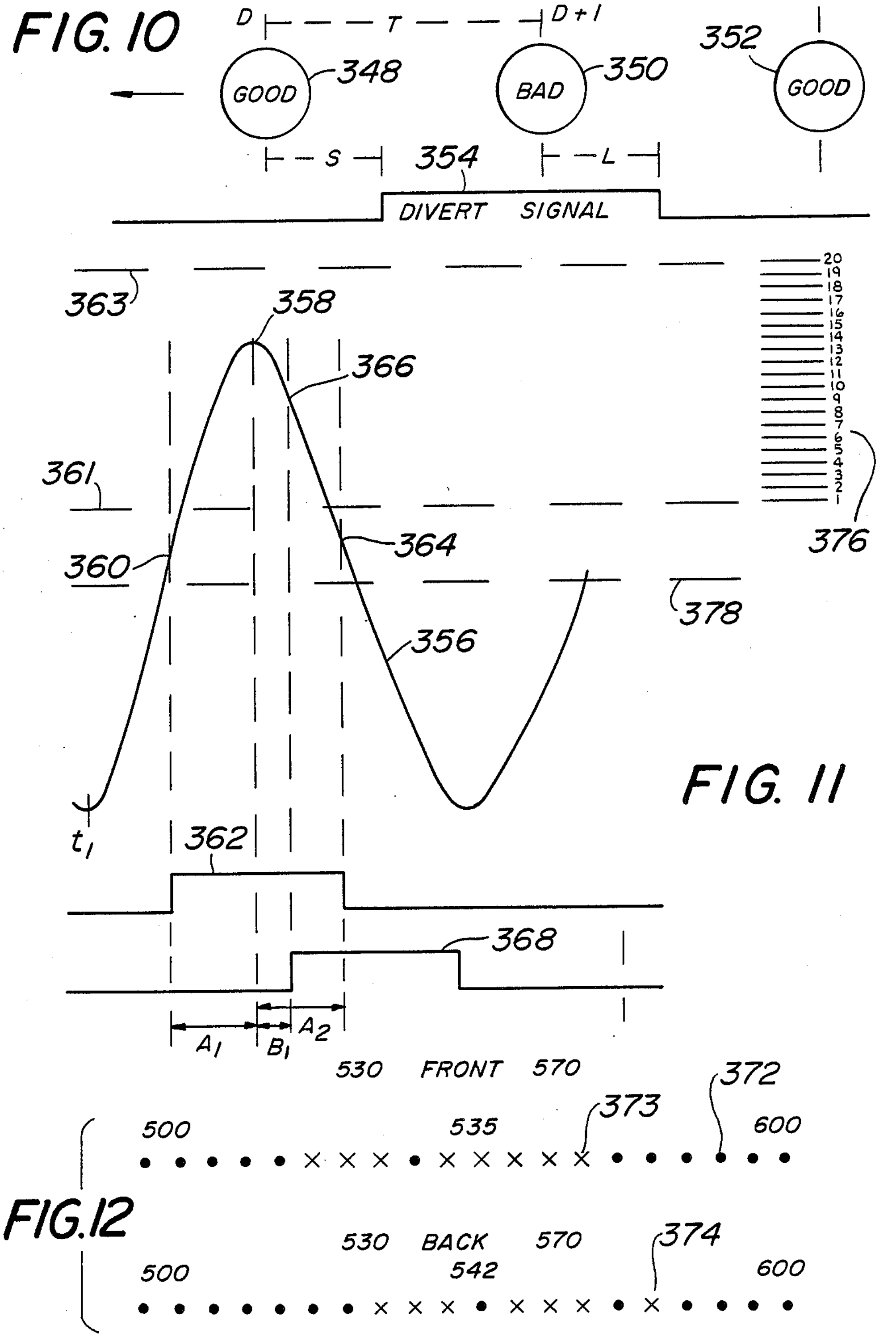
FIG. 10 is a timing diagram illustrating the divert signal timing.
FIG. 11 is a timing diagram illustrating the timing of pulses generated by the proximity probes shown in FIG. 4.
FIG. 12 illustrates a typical histogram-like display generated by the inventive controller.

Referring now to FIGS. 4 and 11, generation of the front and back compression signals 12, 14, the signals from the front and back proximity probes 16 and 18 and the signal from the tool no. 1 proximity probe 20 will be explained.

Referring to FIG. 4, the generation of signals from only the front proximity probe 54 will be explained in detail, it being understood that the generation of signals from the back proximity probe (not shown) is achieved in identical manner.

As is well-known, a tablet press 44 comprises a plurality of upper punches 46 and lower punches 48. Punches 46 and 48 are reciprocable in a die wheel 52 having a plurality of die cavities. As shown by arrow 49, punches 46 and 48 and die wheel 52 rotate together in a clockwise direction but it should be understood that the press can also be arranged so that punches 46 and 48 and die wheel 52 rotate in a counterclockwise direction. In the press 44 shown, there are a plurality of punch combinations (65 combinations are shown). As each die/punch combination passes through a compression station 50 comprising an upper pressure roll 53 and a lower pressure roll (not shown), the punches are urged together to compress the powder fill in the corresponding die cavity. As will be appreciated, the maximum compression force occurs when the punches pass beneath the bottom dead center of the pressure roll 53 as shown at 51. Thus, a strain gauge connected to the pressure roll 53, as taught by U.S. Pat. No. 3,255,716 to Knoechel will produce a sinusoidol wave form 356 as shown in FIG. 11. Peak 358 of sinusoid 356 coincides with the passage of the die/punch cavity beneath the maximum pressure zone 51 of the compression station 50.

Associated with the tablet press 44 is a front proximity probe 54 and a tool no. 1 proximity probe 56. As shown, the front proximity probe 54 is mounted in a stationary position with respect to the rotating die wheel 52 and punches 46, 48. The front proximity probe 54 may be either a magnetic or capacitive type probe which produces a pulse each time one of the punches 46 passes thereby. As shown, the front proximity probe 54 is located a distance d on the downstream side of the maximum compression zone 51 of the compression station 50. The distance d is adjusted so that a punch 46 causes proximity probe 54 to provide a pulse while the punch 46 is still undergoing compression, but after it has exited the maximum compression zone 51. The signal from the front compression probe 54 is provided via lines 16 to the press controller 10.

Although the front proximity probe 54 is shown as being adjacent compression station 50, it will be understood that this proximity probe could be mounted elsewhere so that it is triggered by a punch other than the one undergoing compression. All that is required is that it be mounted so that it produces a pulse just after a punch exits the maximum compression zone 51, as explained below. Since all of the punches are spaced equidistant around the press wheel, the placement of the probe is not critical, as long as the timing requirement explained herein are met.

As shown in FIG. 4, die/punch combination #1 has exited peak compression zone 51, but is still undergoing compression at compression station 50. The leading edge of punch #1 is in front of front proximity probe 54, causing a pulse 368 (FIG. 11) to occur on lines 16, thus indicating that die/punch #1 has exited the peak compression zone 51.

The back proximity probe is mounted with respect to the back compression station in the exact manner as described above for the front proximity probe.

A tool no. 1 proximity probe 56 is also mounted in a stationary position with respect to the rotating die wheel 52 and punches 46, 48. As shown, a metal tag 58 is mounted on the die wheel adjacent to die/punch set no. 1. It will be understood that the probe 56 and metal tag 58 need not be mounted in the precise location shown, but can be located anywhere around the die wheel 52, as long as the placement of probe 56 and metal tab 58 provide a pulse which straddles the compression signal 356, as shown in FIG. 11. It will also be appreciated that the first die/punch combination to undergo compression at compression station 51 after probe 56 detects passage of metal tag 58 will automatically be designated as die/punch set no. 1 by controller 10.

The metal tag 58 rotates with the die wheel 52 and causes proximity probe 56 to provide a pulse each time metal tag 58 passes in front of probe 56, indicating that die/punch set no. 1 is in position in compression station 50. Thus, the pulse from proximity probe 56 is an indication not only that die/punch set no. 1 is in position, but is a synchronizing signal indicating that that the press has completed a full revolution. The signal from proximity probe 56 is provided to the press controller 10 over lines 20.

The metal tag 58 causes the tool no. 1 proximity be probe 56 to generate a signal 362 (FIG. 11) just prior to the time die/punch set designated as set no. 1 passes through the maximum compression zone 51. The alignment of proximity probe 56 so that it produces a pulse which straddles the compression signal 356 is important for reasons which will become apparent hereinafter.

Referring now to FIG. 11, the timing of the signals from the front proximity probe 54 and the tool no. 1 proximity probe 56 will be explained.

When the leading edge of metal tag 58 comes into position in front of tool no. 1 proximity probe 56, a pulse 362 is generated by the tool no. 1 proximity probe. Due to the placement of proximity probe 56 and the metal tag 58 with respect to compression station 50 and maximum compression zone 51, the rising edge of pulse 362 occurs during the positive going portion of sinusoid 356 at a time labelled as 360, just after the positive going portion of sinusoid 356 crosses zero intercept 378. The falling edge of pulse 362 occurs during the negative portion of sinusoid 356 at a time 364 just before the negative going portion of sinusoid 356 crosses the zero intercept 378. Thus, the pulse 362 from the tool no. 1 proximity probe 56 occurs at a time $A_1$ before the peak 358 of sinusoid 356 occurs and persists for a time $A_2$ after the peak 358 of sinusoid 356. It will therefore be appreciated that the pulse 362 coincides with the entry of die/punch set no. 1 into the compression station 50. The falling edge of pulse 362 occurs when the trailing edge of metal tag 58 passes proximity probe 56.

When the leading edge of a punch comes into position in front of front proximity probe 54, a pulse 368 is provided by the front proximity probe. As shown in FIG. 11, the rising edge of pulse 368 occurs just after the peak 358, as shown at 366. The time interval between the peak 358 and the rising edge of pulse 368 is labelled "B". In the illustrative embodiment, the time B corresponds to the distance d of the proximity probe 54 from the maximum compression zone 51. The falling edge of pulse 368 occurs after the trailing edge of the particular punch die/punch combination has passed proximity probe 54.

A pulse from front proximity probe 56 again occurs on the next cycle of sinusoid 356 (not shown) after a time interval B following the next peak 358.

Referring now to FIGS. 2A to 2D, the construction and operation of the circuitry of press controller 10 will be explained.

Figure 2:
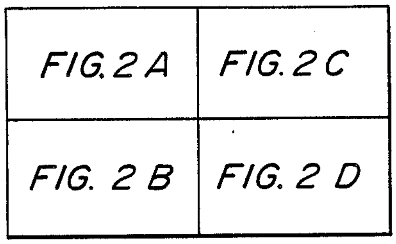
FIG. 2 includes FIGS. 2A through 2D and is a detailed block diagram of the circuitry of the controller according to the invention.
Figure 2A:
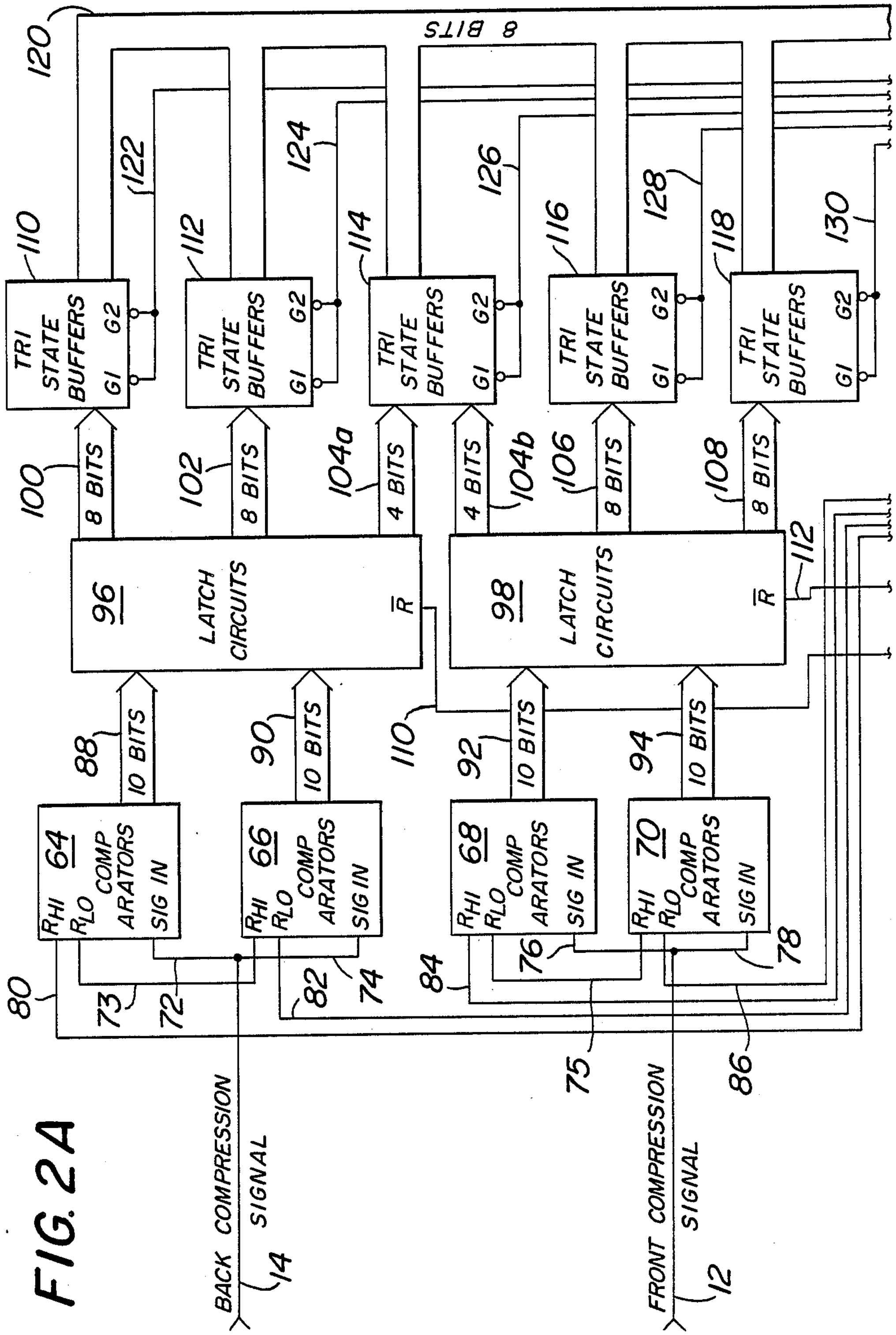

Referring to FIG. 2A, it is seen that the front compression signal is supplied over line 12 to a monitor means 68, 70 via lines 76, 78. In like manner, the back compression signal is supplied over a line 14 to a monitor means 64, 66 via lines 72 and 74. The monitor means 64, 66 for the back compression signal is identical to the monitor means 68, 70 for the front compression signal, except as herein noted. Therefore, only the monitor means 68, 70 for the front compression signal will be described in detail, it being understood that the following discussion is equally applicable to the monitor means 64, 66 for the back compression signal.

The monitor means 68, 70 continuously monitors the front compression signal on line 12, and continuously provides during at least the positive going portion of the front compression signal (i.e., the positive going portion of sinusoid 356 in FIG. 11), a N bit digital word having a value indicative of the magnitude of the compression signal. As shown, the N bit digital word is supplied to latch circuits 98 via busses 92, 94.

The monitor means 68, 70 comprise a number, N, of comparators which receive the compression signal on line 12 and compare it to predefined reference values. In a preferred embodiment, the monitor means 68, 70 comprises two 10 step dot/bar display drivers such as National Semiconductor LM 3914 dot/bar display drivers. Thus, block 68 may be a first LM 3914 and block 70 may be a second LM 3914 which together define the front monitor means 68, 70. As is known to those skilled in the art, each of these devices comprise ten comparators and a ten stage voltage divider. Thus, in tandem, blocks 68 and 70 provide a 20 stage comparator network and a 20 stage voltage divider. It will be understood, however, that although a 20 stage voltage divider is provided, the circuit could be made operational with only a 19 stage voltage divider. It should be further understood that the monitor means may be comprised of any number, N, of comparators, so long as the number N, is 3 or more. It will be realized that for a monitor means having N comparators, a voltage divider having having at least N−1 stages is required. Thus, in the preferred embodiment, each monitor means 68, 70 and 64, 66 comprise 20 comparators and at least a 19 stage voltage divider, which provides a 20 bit digital word.

Each comparator has a first input (inverting input) a second input (non-inverting input) and an output. As can be seen from a review of the LM 3914 specification sheet, each of the first inputs are connected in common to receive the compression signal on line 12. Each of the second inputs are connected to a successive stage of the voltage divider. The uppermost stage of the voltage divider is designated as $R_{HI}$ and a lowermost stage of the voltage divider is designated as $R_{LO}$. Thus, the lowermost stage of the voltage divider in block 68 is connected to the uppermost stage of the voltage divider in block 70 via a line 75 to form a twenty stage comparison network. As will be explained hereinafter, the $R_{HI}$ input of block 68 is connected via a line 84 to a first upper reference voltage (upper alarm limit) via line 84 and the $R_{LO}$ input on block 70 is connected to a first lower reference voltage (lower alarm limit) via line 86. In like manner, the $R_{LO}$ input on block 64 is connected to the $R_{HI}$ input on block 66 via a line 73 and the RHI input of block 64 is connected to a second upper reference voltage (upper alarm limit) via line 80 and the $R_{LO}$ input of block 66 is connected to a second lower reference (lower alarm limit) voltage via line 82.

The difference between the upper and lower reference voltages supplied to the monitor means 64, 66 and 68, 70 defines an acceptable range wherein the respective compression signal 12, 14 may fall. It will be appreciated that if the magnitude of the compression signal falls within this range, the appropriate monitor means 64, 66 or 68, 70 will classify the compression signal 12 or 14 into one or more categories defined by the voltage divider and comparator network. Thus, the number of successive comparators which become "turned on" (i.e. change from a logic "zero" output to a logic "one" output) is a direct indication of the magnitude of the compression signal. The comparator outputs collectively define a 20-bit digital word which appears on bus 92, 94 for the front monitor means and on bus 88, 90 for the back monitor means. The number of successive bits which are a logic "one" is an indication of the number of categories into which the compression signal has been classified, and is also an indication of the value of the compression signal relative to the upper and lower reference voltages.

It will be appreciated that as the magnitude of the compression signal varies, the number of successive logic "1"'s which appear on the bus 92, 94 or 88, 90 will likewise vary. Thus, if the magnitude of the compression signal exceeds the upper reference voltage, all of the bits on the bus 92, 94 or 88, 90 will be logic "1"'s. On the other hand, if the magnatude of the compression signal fails to exceed the lower reference voltage, all of the bits on the bus 92, 94 or 88, 90 will be logic "0"'s. It will also be appreciated that the resolution of the N bit digital word is determined by the quotient of the difference between the upper and lower reference voltages divided by N.

The operation of the monitor means is further explained by reference to FIG. 11. Reference numeral 361 designates the value of a lower reference voltage which is being supplied to the $R_{LO}$ input on either block 66 or 70. Reference numeral 363 designates the value of an upper reference voltage which is being supplied to the $R_{HI}$ input on either block 64 or 68. The difference between the value of the reference voltage designated by 361 and the value of the reference voltage designated by 363 defines a range of acceptable values where the peak 358 of sinusoid 356 may fall. It will be seen that from the time $t_1$ (when sinusoid 356 is at its negative-most value) until the time it reaches the value of the lower threshold voltage designated by 361, no comparators will be "turned on". However, as the magnitude of the sinusoid 56 continues to increase, a number of successive comparators will be "turned on". Thus, in FIG. 11, it will be seen that the first fourteen comparators will be turned on, i.e., comparators one through fourteen inclusive will have a logic "1" at their output and comparators 15 through 20 inclusive will have a logic "0" at their output when the sinusoid 356 is at its peak 358. Thus, the maximum number of comparators which are "turned on" is a direct indication of the peak magnitude of the sinusoid 356 relative to the reference voltages 361 and 363. It will be further understood that as the magnitude of the signal begins to decrease along its negative going portion, the comparators will begin to turn off. Thus, the output of the monitor means 68, 70 and 64, 66 is a 20-bit digital word which has a value continuously indicative of the value of the compression signal during at least the time a compression force is being applied, substantially as shown between the times designated by 360 and 364. Because the value of the digital word (i.e., the number of sequential logic "1"'s) is continuously varying with the magnitude of the compression signal, a circuit is required to latch the highest value (i.e., the greatest number of successive logic "1"'s) provided by the monitor means during the positive going portion of the sinusoid 356. Latch circuits 96 and 98 are provided for this purpose. Latch circuits 96 and 98 are shown in block configuration, but it should be understood that there is one latch for each bit provided by the monitor means 64, 66 and 68, 70. Thus, block 96 comprises 20 digital latch circuits for latching the highest value digital word provided by monitor means 64, 66 on bus 88, 90. Likewise, block 98 comprises 20 digital latch circuits for latching the highest value digital word provided by the monitor means 68, 70 on bus 92, 94. The latch circuits may be National Semiconductor DM 74LS279 digital latches. As shown, the outputs of the latch circuits are provided on a plurality of 8-bit busses 100, 102, 104, 106 and 108. It will be seen that 8-bit bus 104 actually comprises two 4-bit busses, 104*a* and 104*b*. Bus 104*a* originates from the latch circuits 96 associated with the back compression signal and bus 104*b* originates from the latch circuits 98 associated with the front compression signal. Thus, latch circuit 96 provides a 20-bit output and latch circuit 98 provides a 20-bit output. As will be appreciated by those skilled in the art, the outputs of latch circuits 96 and 98 are provided as 8-bit busses to facilitate transfer of data through tri-state buffers 110, 112, 114, 116, and 118, onto 8-bit data bus 120, through I/O port 132 and onto 8-bit data bus AD0-AD7 to microprocessor 300 for processing.

Latch circuits 96 and 98, provide two modes of data transfer between the monitor means and the tri-state buffers. In a first mode, a logic "0" is applied to the R inputs of latch circuits 96 and 98 via lines 110 and 112 respectively. In this "0" mode, the outputs of the latch circuits follows the inputs. That is, data is not latched in this mode, but instead the latch circuits act as buffers. The latch circuits are placed in a second mode when a logic "1" is applied to the R inputs of latch circuits 96 and 98 via lines 110 and 112. In this "1" mode, the latch circuits latch the outputs provided by the monitor means 64, 66 and 68, 70. Thus, when the latch circuits are in the "1" mode, they latch the highest value of the data word provided by the monitor means 64, 66 and 68, 70. This value is held by the latch circuits 96, 98 for reading by the microprocessor 300 at a subsequent time.

Tri-state buffers 110, 112, 114, 116 and 118, which may be Texas Instruments SN74LS244 tri-state buffers, facilitate selective data transfer from the latch circuit outputs 100, 102, 104, 106, 108 to the microprocessor 300 for storage and processing. The tri-state buffers are selectively gated to transfer data from the latch circuits to inputs PA0-PA7 on I/O port 132 via bus 120. The tri-state buffers are selectively gated under microprocessor command via outputs PB2-PB6 on I/O port 132. In this manner, it will be appreciated that the 20-bit digital words supplied by latch circuits 96, 98 can be ready by microprocessor 300 for subsequent processing. Those skilled in the art will appreciate that microprocessor 300 will operate under a suitable operating program to mask out the data appearing on bus 104*b* when only the 20-bit digital word from latch circuit 96 is desired and to mask out the data appearing on bus 104*a* when only the 20-bit word from latch circuit 98 is desired.

Figure 2B:
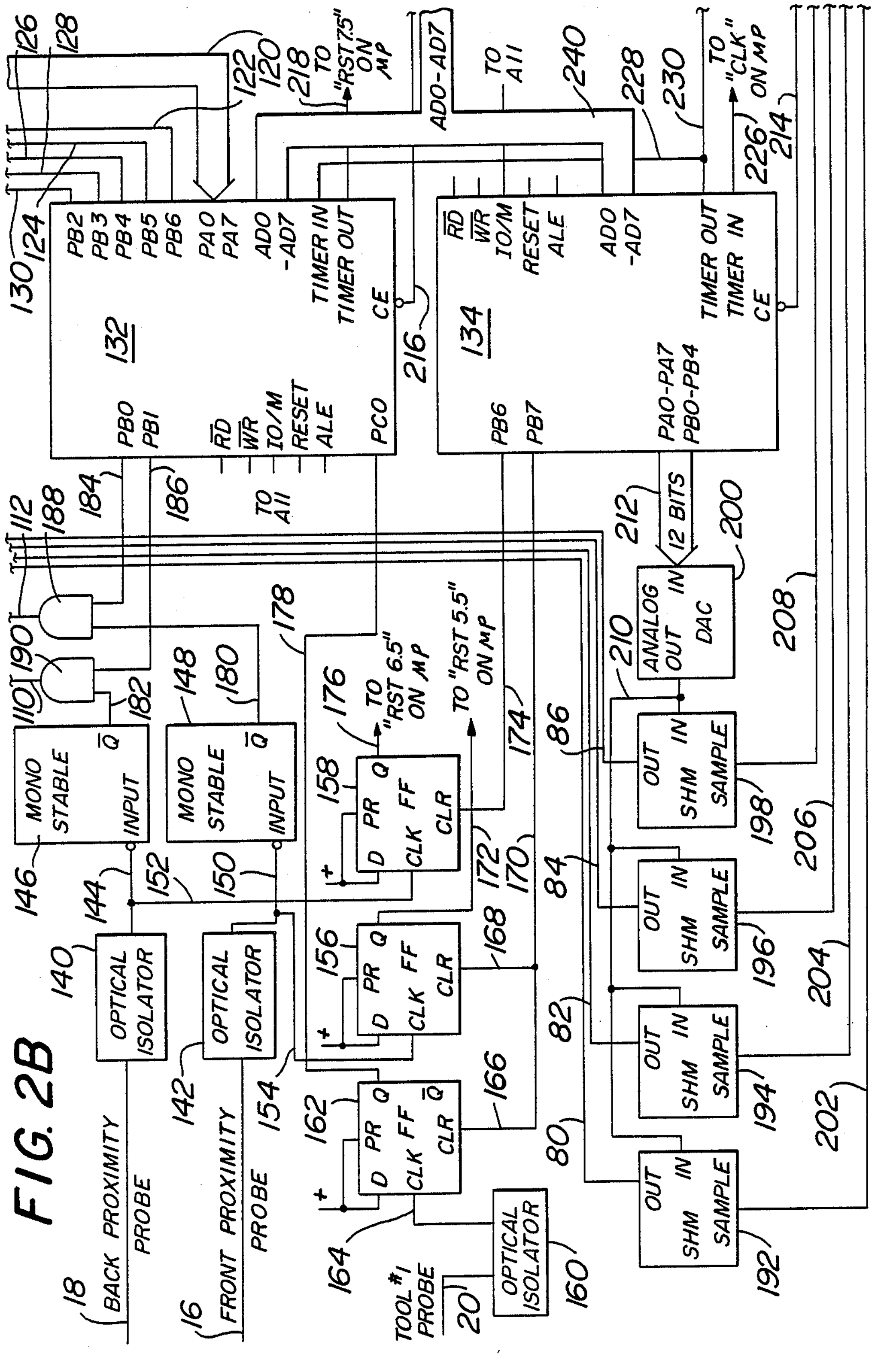

Turning now to FIG. 2B, the signal 368 from the front proximity probe 54 is supplied over line 16, via an optical isolator 142 to (1) the input of a monostable multivibrator 148 via a line 150 and (2) the CLK input of a D flip/flop 156 via a line 154. The signal from the back proximity probe is supplied over line 18 via an optical isolater 140 to (1) the input of a monostable multivibrator 146 via a line 144 and (2) the CLK input of a D flip/flop 158 via a line 152. The signal from the tool no. 1 proximity probe 56 is supplied over line 20 via an optical isolater 160 to the CLK input of a D flip/flop 162 over line 164.

The Q output of flip/flop 162 is supplied via a line 178 to the PCO input of I/O port 132. The rising edge of the tool no. 1 proximity probe signal 362 clocks flip/flop 162 and causes the Q output thereof to become high (i.e., logic "1"). As will be explained hereinafter, microprocessor 300 regularly polls the Q output of flip/flop 162 by reading the status of input PCO to determine if the tool no. 1 proximity probe signal has occurred.

The Q output of flip/flop 156 is supplied via a line 172 to the RST 5.5 interrupt input on microprocessor 300. The Q output of flip/flop 158 is connected via a line 166 to the RST 6.5 interrupt input on microprocessor 300. The rising edge of the front proximity probe signal 368 clocks flip/flop 156 and causes the Q output thereof to become high (i.e., logic "1"), thereby interrupting microprocessor 300 and signalling it that the front proximity probe signal has occurred. Thus, the RST 5.5 interrupt is an indication that a die/punch combination has just exited the peak compression zone 51 of the front compression station 50 and that the latches 98 contain a "valid" data word, i.e. a data word having a value indicative of the peak magnitude of the front compression force signal.

In a like manner, the rising edge of the back proximity probe signal clocks flip/flop 168 and causes the Q output thereof to become high (i.e., logic "1"), thereby interrupting microprocessor 300 and signalling it that the back proximity probe signal has occurred. Thus, the RST 6.5 interrupt is an indication that a die/punch combination has exited the peak compression zone of the rear compression station (not shown) and that the latches 96 contain a valid data word, i.e., a data word having a magnitude indicative of the peak magnitude of the back compression signal.

The CLR inputs of flip/flops 162 and 156 are connected via lines 166, 168 and 170 to the PB7 output of I/O port 134. The CLR input of flip/flop 158 is connected via a line 174 to the PB6 output port of I/O port 134. As will become evident hereinafter, flip/flops 162 and 156 are cleared by microprocessor 300 after it has completed servicing an interrupt routine (procedure interrupt routine 5.5) associated with the interrupt signal from the front proximity probe 54 which set flip/flop 156. This enables the next interrupt to occur. Similarly, flip/flop 158 is cleared by microprocessor 300 after it has completed servicing an interrupt routine (procedure interrupt routine 6.5) associated with the interrupt signal from the back proximity probe which set flip/flop 158.

Devices 146 and 148 are monostable multivibrators, such as Texas Instruments SN54LS221 integrated circuits and are configured as "one shots" in well known manner. Thus, the Q output of monostable 146, which is normally high (logic "1") becomes a logic "0" for a short period of time in response to the negative going edge of the back proximity probe signal. The Q output of monostable 146 is applied to one input of an AND gate 190 via a line 182; the other input of gate 190 is supplied by the PB1 output of I/O port 132 via line 186. Output PB1 is normally a logic "1" except during the "calibrate mode" as will be explained hereinafter. The output 110 of AND gate 190 is connected to the R input of latch circuit 96. It will be appreciated that when output PB1 is a logic "1" a pulse on the Q output of monostable 146 will clear latch circuits 96. Thus, in normal operation, latch circuits 96 are cleared by the negative going edge of the back proximity probe signal.

The operation of monostable 148 is identical to that of 146 except that it is responsive to the negative going edge of the front proximity probe signal 368. Similarly, the PB0 output of I/O port 132 is normally a logic "1" except during the calibrate mode. An AND gate 188 receives the Q output of monostable 148, via line 180 and the PB0 output of I/O port 132 via line 184. The output of AND gate 188 is supplied via line 112 to the R input of latch circuits 98. Thus, it will be understood that the latch circuits 98 will be cleared when the pulse occurs on the Q output of 148, i.e. in response to the negative going edge of the front proximity probe signal 368.

Four sample and hold modules (SHM's) 192, 194, 196 and 198 provide the upper and lower reference voltages to the front and back monitor means 64, 66 and 68, 70. The output of SHM 198 is provided over a line 86 to the $R_{LO}$ input of block 70 and provides the lower reference voltage (i.e., low alarm limit) for the front monitor means 68, 70. The output of SHM 196 is provided over a line 84 to the $R_{HI}$ input of block 68 of the monitor means 68, 70 and provides the upper reference voltage (i.e., the upper alarm limit) for the front monitor means. The output of SHM 194 is provided over a line 82 to the $R_{LO}$ input of block 66 of monitor means 64, 66 and provides the lower reference voltage (i.e., the lower alarm limit) for the back monitor means. The output of SHM 192 is provided over a line 80 to the $R_{HI}$ input of block 64 of monitor means 64, 66 and provides the upper reference voltage (i.e., the upper alarm limit) for the back monitor means.

A 12 bit digital to analog converter (DAC) 200 receives 12 bits of data from outputs PA0–PA7 and PB0–PB4 of I/O port 134 via bus 212. The analog output of DAC 200 is supplied to the inputs of SHM's 192, 194, 196 and 198 via a line 210. The SHM's are selectively gated via their SAMPLE inputs via lines 202, 204, 206 and 208 respectively so that the appropriate SHM receives and stores the analog voltage appearing at the output 210 of DAC 200. Thus, during the "monitor mode", when the upper and lower reference voltages for the monitor means are being set by the operator, the microprocessor 300 provides a series of 12-bit words wherein each 12-bit word has a value which corresponds to the value of the desired analog reference voltage (alarm limit) to be supplied to the monitor means. The appropriate SHM is gated via signals from outputs PA2, PA3, PA6 and PA7 of I/O port 138 to receive the appropriate analog voltage from DAC 200. Thus, for example, a first 12-bit word may be provided on bus 212, converted by DAC 200 and applied to the inputs of all SHM's 192, 194, 196 and 198. However, microprocessor 300, via I/O port 138, instructs only one of those four SHM's to gate that analog voltage. By appropriately varying the value of the 12-bit word applied to the DAC 200 and gating the SHM's in proper sequence, the desired upper and lower reference voltages (alarm limits) for the front and back monitor means can be established and maintained.

The I/O ports 132, 134, 136, 138, 232 and 234, are, in the preferred embodiment, Intel 8155-2 integrated circuits. Each I/O port 132, 134, 136, 138, 232 and 234 has RD, WR, IO/M, RESET, and ALE inputs which are connected to the corresponding output on microprocessor 300. Moreover, as will be apparent to those skilled in the art, these I/O ports are equipped with programmable timers. The TIMER IN input on I/O port 134 receives the CLK output from microprocessor 300. The CLK output from microprocessor 300 is a 5 MHz clock signal (half of the system clock frequency, 10 MHz). The TIMER OUT output of I/O port 134 is connected to the TIMER IN input of I/O port 132 via a line 228 and is also connected to the TIMER IN inputs of I/O ports 136, 138, 232 and 238 via a line 230. The timers in I/O ports 132 and 134 are programmed to provide a pulse on the TIMER OUT output of I/O port 132 every 4 msec. This pulse is provided to the RST 7.5 input on microprocessor 300 as an interrupt via line 218. Thus, microprocessor 300 is interrupted every 4 msec.

Data communications between the I/O ports 132, 134, 136, 138, 232 and 234 and microprocessor 300 are achieved via a bi-directional data bus 240 comprising lines AD0–AD7.

Figure 2C:
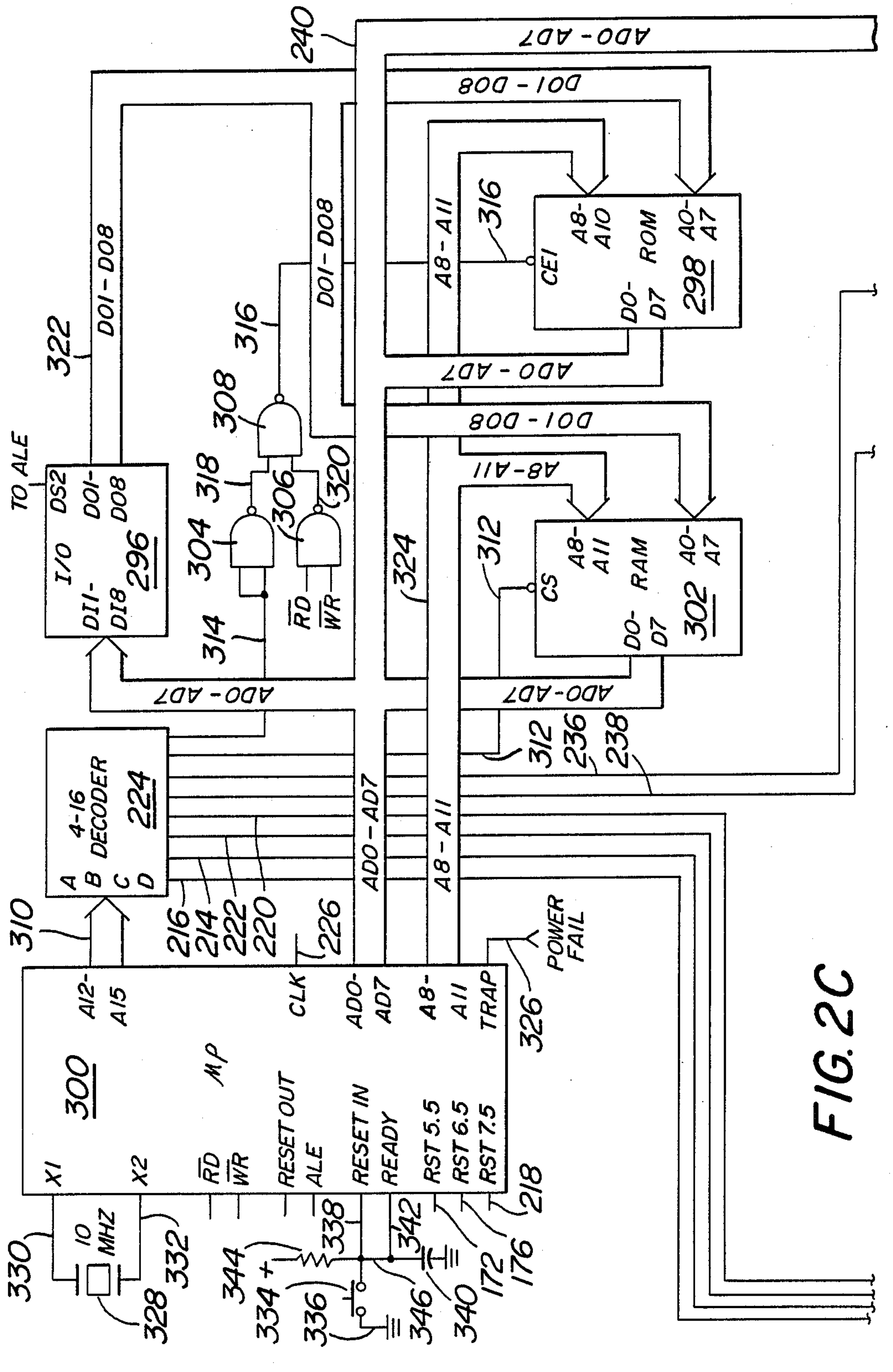
Figure 2D:
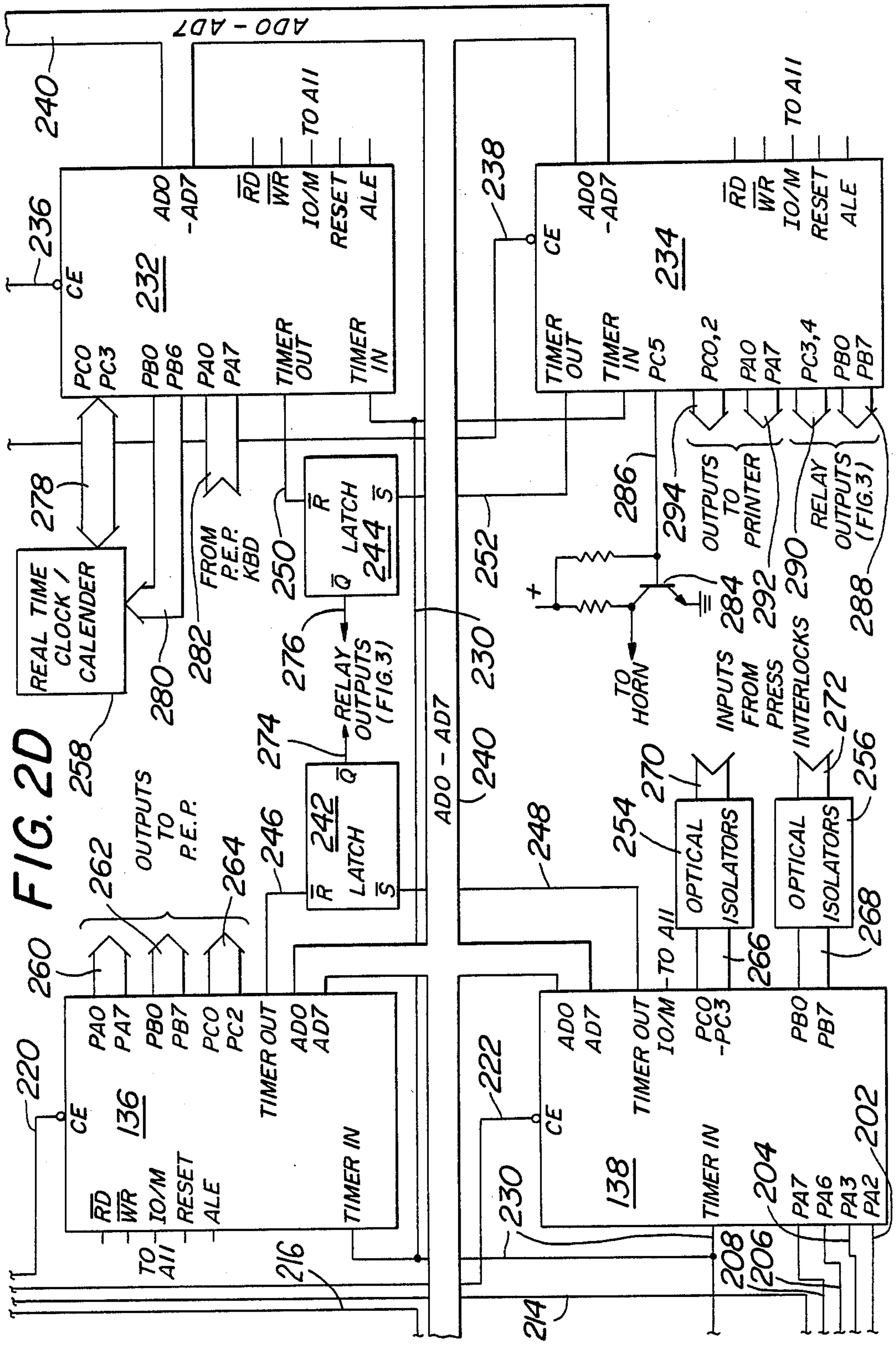

Turning now to FIG. 2D, outputs PA0–PA7, PB0–PB7 and PC0–PC2 of I/O port 136 communicate with a display, i.e., the PEP data display panel. Thus, data communications is established between the display portion of the PEP panel and microprocessor 300 via I/O port 136.

Inputs PB0–PB7 and PC0–PC3 of I/O port 138 communicate via busses 266 and 268 and optical isolators 254 and 256 to receive the inputs from the before-mentioned press interlocks. Thus, the press interlocks are signals from the tablet press changeable between first and second states, in response to the occurrence of an undesirable event such as an increase in operating temperature or pressure. Microprocessor 300 regularly polls inputs PB0–PB, PC0–PC3 determines if any of the press interlocks have changed from a first state to a second state and takes appropriate corrective action.

Figure 3:
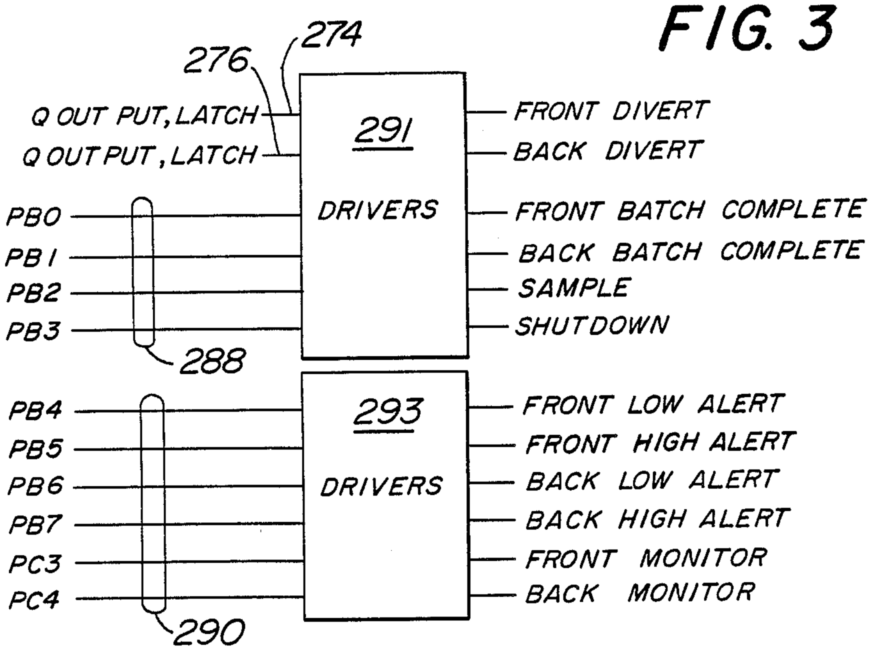
FIG. 3 is a block diagram of additional circuitry associated with the controller.

Outputs PA0–PA7 and PC0–PC2 of I/O port 234 communicate with a printer to provide hard copy print-out of tablet production data such as number of tablets in a batch, production rates, batch identification, histograms, etc. Outputs PB0–PB7 and PC3–PC4 of I/O port 234 communicate via busses 288, 290 to provide the before-mentioned controller outputs, as shown in detail in FIG. 3. Specifically, these outputs are provided to relay drivers 291, 293 to provide the before-mentioned controller output signals.

Output PC5 of I/O port 234 is connected via a line 286 to the base of a switching transistor 284 to drive a solid state beeper or horn associated with the PEP display/entry panel. As will be explained, the horn "beeps" to provide an acknowledgment each time the operator makes an entry into the PEP panel.

Inputs PA0–PA7 of I/O port 232 receive, via bus 282, data from the keyboard portion of the PEP. Outputs PB0–PB6 and inputs/outputs PC0–PC3 of I/O port 232 communicate, via buses 280 and 278 respectively with a real time clock/calendar 258. Clock/calendar 258 provides real time and date data to microprocessor 300 for purposes which will become evident hereinafter.

Latches 242 and 244 are provided for controlling the operation of divert gates associated with the tablet press. Specifically, latch 242 is associated with a front divert gate and latch 244 is associated with a back divert gate. Latches 242 and 244 may be a 74LS279 integrated circuit. The TIMER OUT output of I/O port 136 is connected to the R input of latch 242 via line 246 and the TIMER OUT output of I/O port 138 is connected to the S input of latch via line 248. The Q output of latch 242 is supplied to one of the relay drivers 291 via a line 274 and comprises the front divert output signal.

The TIMER OUT output of I/O port 232 is connected to the R input of latch 244 and the TIMER OUT output of I/O port 234 is connected to the S output of 244 via a line 252. The Q output of latch 244 is connected via a line 276 to one of the drivers 291 and comprises the back divert output signal.

As will be explained, the TIMER OUT outputs of I/O port 136, 138 and 232, 234 set and reset the latches 242 and 244 to provide divert pulses of programmable duration.

As illustrated in FIG. 2C, microprocessor 300, which in the preferred embodiment is an Intel 8085AH-2 8-bit microprocessor, is the heart of the controller circuitry. A 10 MHz crystal oscillator 328 is connected to inputs X1 and X2 of microprocessor 300 via lines 330 and 332. A reset button 334 is provided for resetting microprocessor 300 in well-known manner. Thus, one side of push button 334 is connected to ground via line 336, and the other side is connected to the RESET input of microprocessor 300 via line 338. An RC network 344, 340 is provided, the READY input of microprocessor 300 being connected to the positive side of capacitor 340.

A power fail circuit (not shown) provides the TRAP interrupt input which indicates a power fail condition to microprocessor 300 in well-known manner.

Bi-directional data/address bus 240 is comprised of lines AD0–AD7, as previously mentioned. Lines AD-0–AD7 are supplied to the DI1–DI8 inputs of an I/O port 296, which may be an Intel 8212 I/O port. Together with the ALE signal from microprocessor 300, I/O port 296 serves to separate the address lines from the combination address/data bus 240. The address bus 322 contains the low order address lines (designated DO1–DO8). Bus 322, together with address lines A8–A11 from microprocessor 300 are used to address RAM 302 and ROM 298. Data communications between RAM and microprocessor 300, and ROM and microprocessor 300 are achieved via combination address/data bus 240. The operating software for the controller is stored in the ROM 298; user inputs, such as batch count, alert limits, etc., are stored in the RAM 302.

A 4–16 decoder 224, such as a DM74LS154 multiplexer, receives high order address lines A12–A15 from microprocessor 300 via bus 310. The decoded or demultiplexed outputs of 4–16 decoder are used for addressing the I/O ports, RAM and ROM via lines 214, 216, 220, 222, 236, 238, 312 and 314.

ROM 298 is selected via a logic network comprising gates 304, 306 and 308. Signals from the 4–16 decoder (line 314) together with the RD and WR signals from microprocessor 300 govern selection of ROM, as shown.

Operation

The operation of the controller 10, including the operation of the control algorithm will now be explained.

Microprocessor 300 operates under control of an operating algorithm disclosed in FIGS. 5 through 9. Normally, microprocessor 300 operates under control of the main loop routine 612 (FIGS. 9*a* and 9*b*) except when it is interrupted by a signal from either the front or back proximity probe or the 4 msec timer. The rising edge of the front proximity probe signal 368 interrupts the processor 300 via the RST 5.5 interrupt input and vectors software control to the procedure interrupt 5.5 routine illustrated in FIGS. 7*a* and 7*b*. The rising edge of the back proximity probe signal interrupts processor 300 via the RST 6.5 interrupt input and vectors software control to procedure interrupt 6.5 routine illustrated on FIGS. 8*a* and 8*b*. The 4 msec timer output of I/O port 132 interrupts processor 300 via the RST 7.5 interrupt input and vectors software control to the procedure interrupt 7.5 routine shown in FIG. 5. As will be explained, the procedure interrupt 5.5 routine (FIGS. 7*a* and 7*b*) also checks for the occurrence of the tool no. 1 proximity probe signal.

Prior to running the controller in a production mode, the controller is set in a "calibrate mode" for calibrating the controller to the particular strain gauges in the force applying members of the tablet press. In the "calibrate mode", the PB0 and PB1 outputs of I/O controller 132 are each a logic "0" so that the latch circuits 96 and 98 do not latch data. When the latches are in this "0" mode, they do not latch data, but instead act as buffers so that the outputs 100, 102, 104, 106 and 108 follow the inputs 88, 90, 92 and 94. During the "calibrate mode, the value of the 12-bit word being supplied by I/O port 134 on bus 212 is displayed to allow the operator to set zero adjustments for calibrating the strain guage output to the range of the DAC 200. Thus, in the calibrate mode, the pressure rolls are adjusted so that they are not applying any force to a die/punch combination (i.e., the pressure rolls are adjusted to their extreme minimum force position) and the digital value supplied to the DAC is adjusted by microprocessor 300. Microprocessor 300 searches for the correct digital value which, when applied to the DAC 200, produces a signal substantially equal in magnitude to the signal supplied by the press. This is achieved by reading the 20 bit word supplied by latch means 96 or 98 when the high and low alarm limits are applied and checking to see if all of the bits of the 20-bit word are "0"'s or "1"'s. If all of the bits are "0"'s or "1"'s, the alarm limits are changed and the sequence repeated until a correct near zero digital value is found. This value is stored in RAM for later reference. Then, the press is placed in the "monitor" or "validate" mode and the pressure rolls are adjusted so that they apply a known force to a die/punch combination and the digital value supplied to the DAC 200 is adjusted to correspond to the desired upper operating range. An example best illustrates adjustment in the calibrate mode.

Assume that a standard 10 ton tablet press equipped with the inventive controller will be operated so that it will apply a 4 ton compression force to powder fill, i.e., the press will be operated at forty percent of its maximum capability. First, either the die wheel 52 is rotated so that no force is being applied to a die/punch combination, or the pressure rolls are adjusted to their extreme minimum force position. The digital value supplied to the DAC 200 is adjusted by the microprocessor 30 to a near zero value as previously explained. This value is stored in RAM as a "0" value for later reference. The operator then enters the percent of capacity at which the press will be operated, in this case, forty percent. This value is also stored in RAM. With the press in operation and in either the "validate" or "monitor" mode, the pressure rolls are then adjusted to apply a 4 ton compression force and the digital value supplied to the DAC 200 is adjusted accordingly by microprocessor 300. In this case, the DAC 200 is a 12-bit DAC, so DAC input is set to forty percent of $2^{12}$ (4,096) or approximately 1,638. This number is stored in RAM as a "span" value for later reference.

It will be appreciated that given the full capacity (tons) of the press, the percent of load at which the press will be operating, and the digital values supplied to the DAC at zero load and operating load, microprocessor 300 can determine, with fair accuracy, the actual pressure forces which are being applied to powder fill in the die cavities from the data words supplied by the latch means 96, 98. Thus, given the digital values which correspond to the upper and lower alarm limits supplied to the monitor means, and the number of ranges or classifications into which the peak compression signal has been classified (i.e. the value of the 20-bit digital word), the compression force represented by the 20-bit digital word can be accurately determined by well-known methods.

After initial calibration of the tablet press, the operator may operate the controller in a "monitor mode". During the "monitor mode" the outputs PC3 and PC4 on bus 290 of I/O port 234 are active and hence the monitor outputs (FIGS. 1 and 3) are also active. These outputs are user selectable, but typically are used to activate the front and back divert gates on the front and back portions of the tablet press during the monitor mode. Thus, in the monitor mode, tablets are manufactured, but are diverted since, as will be explained hereinafter, these tablets are not production quality tablets.

The "monitor mode" is used to set the reference voltages (alarm limits) applied on lines 80, 82, 84 and 86 to the monitor means 64, 66 and 68, 70 and also to set "alert limits" to be explained hereinafter. Thus, the reference voltage applied to the $R_{HI}$ input on line 80 defines an upper alarm limit for the back monitor means 64, 66 and the reference voltage applied to the $R_{LO}$ input on line 82 defines a low alarm limit for the back monitor means 64, 66. Similarly, the reference voltage applied to the $R_{HI}$ input line 84 is a high alarm limit and the voltage applied on to the $R_{LO}$ input line 86 is a low alarm limit for the front monitor means 68, 70. As will be explained hereinafter, if the magnitude of the compression signal fails to exceed the lower alarm limit, the appropriate latch 242 or 244 will be set for a predetermined time duration after a predetermined time delay to activate either a front or back divert gate associated with the tablet press.

In addition to setting the upper and lower alarm limits in the monitor mode, the operator may also set upper and lower alert limits for both the front and back compression stations. The upper and lower alert limits define a band falling within the band defined by the upper and lower alarm limits. Thus, the band defined by the alert limits is narrower than the band defined by the alarm limits. The alert limits are stored in a memory location for comparison to the average value of the data words read from the latch circuits 96, 98. As will be explained hereinafter, if the upper alert limit is exceeded, then, either output PB5 or PB7 becomes active to cause a fill adjust mechanism associated with the tablet press to reduce the amount of powder fill in the die cavities. On the other hand, if the compression signal fails to exceed the lower alert limit, then either output PB4 or PB6 becomes active to cause the fill adjust mechanism to increase the amount of powder fill in the die cavities.

While the operator is setting the upper and lower alarm limits, the outputs PA7, PA6, PA3 and PA2 of I/O port 138 become active in the proper sequence so that the proper SHM 192–200 will receive and hold the signal provided by DAC 200. For example, if the operator were setting the upper alarm limit for the monitor means 64, 66, the value that he enters through the PEP panel is converted by microprocessor 300 to a 12-bit digital number and then to a corresponding analog voltage by DAC 200. Microprocessor 300 will then cause output PB2 of I/O port 138 to become active so that SHM 192 receives the voltage supplied by DAC 200. Hereinafter, this voltage is supplied over line 80 to the $R_{HI}$ input of monitor means 64, 66. The lower alarm limit for monitor means 64, 66 and the upper and lower alarm limits for the monitor means 68, 70 are set in like manner, the microprocessor 300 selectively causing appropriate ones of outputs PA3, PA6 and PA7 of I/O port 138 to become active so that the appropriate one of the SHM's receives the voltage supplied by DAC 200.

After the operator has properly set the upper and lower alarm limits, and the upper and lower alert limits, the controller is switched to a running or production mode. At this time, the FRONT monitor and BACK monitor outputs, which were active during the monitor mode, become inactive so that tablets are no longer continuously diverted. Thus, in the production mode, tablets are normally supplied along a chute to a primary collection bin for collection of production tablets.

Figure 9A:
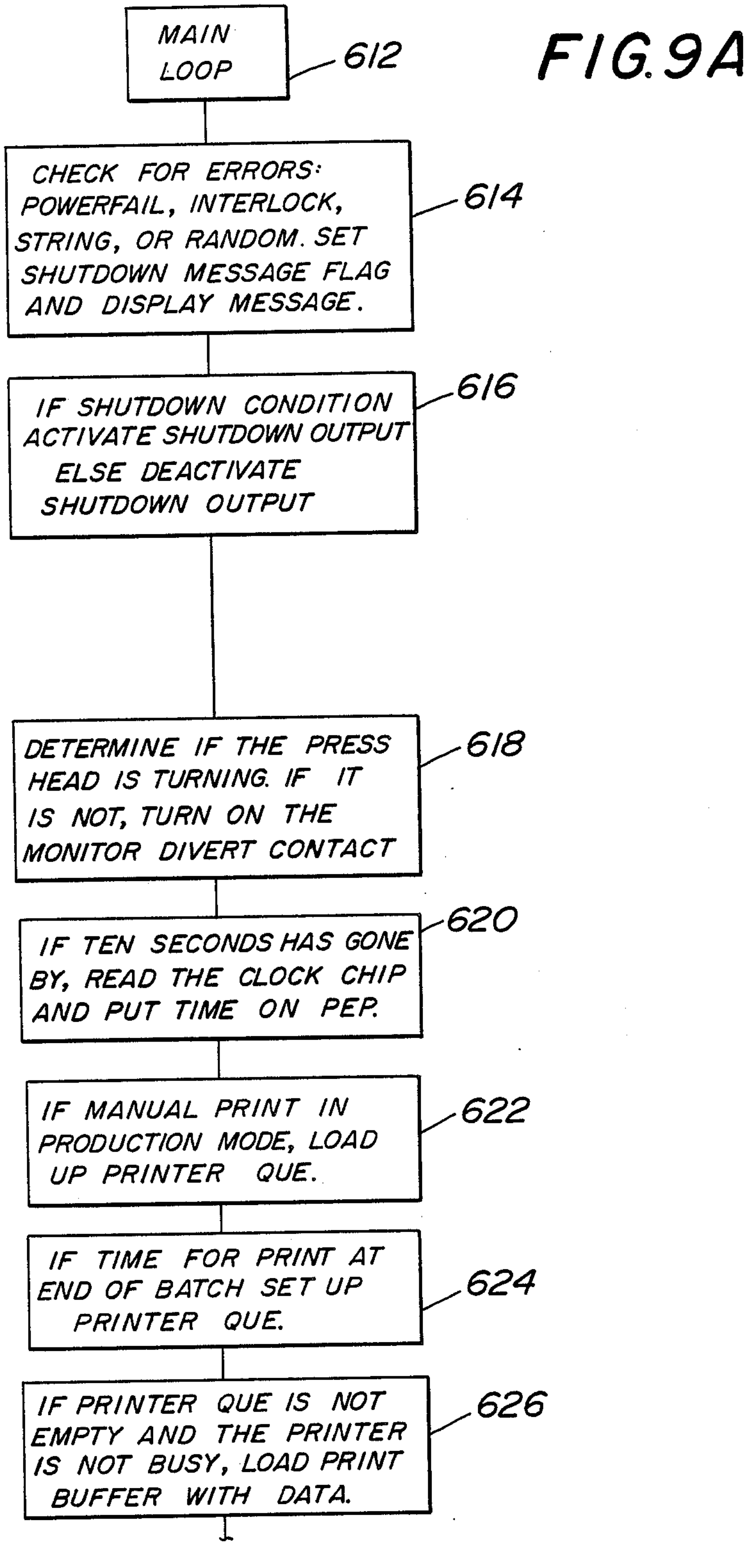
Figure 9B:
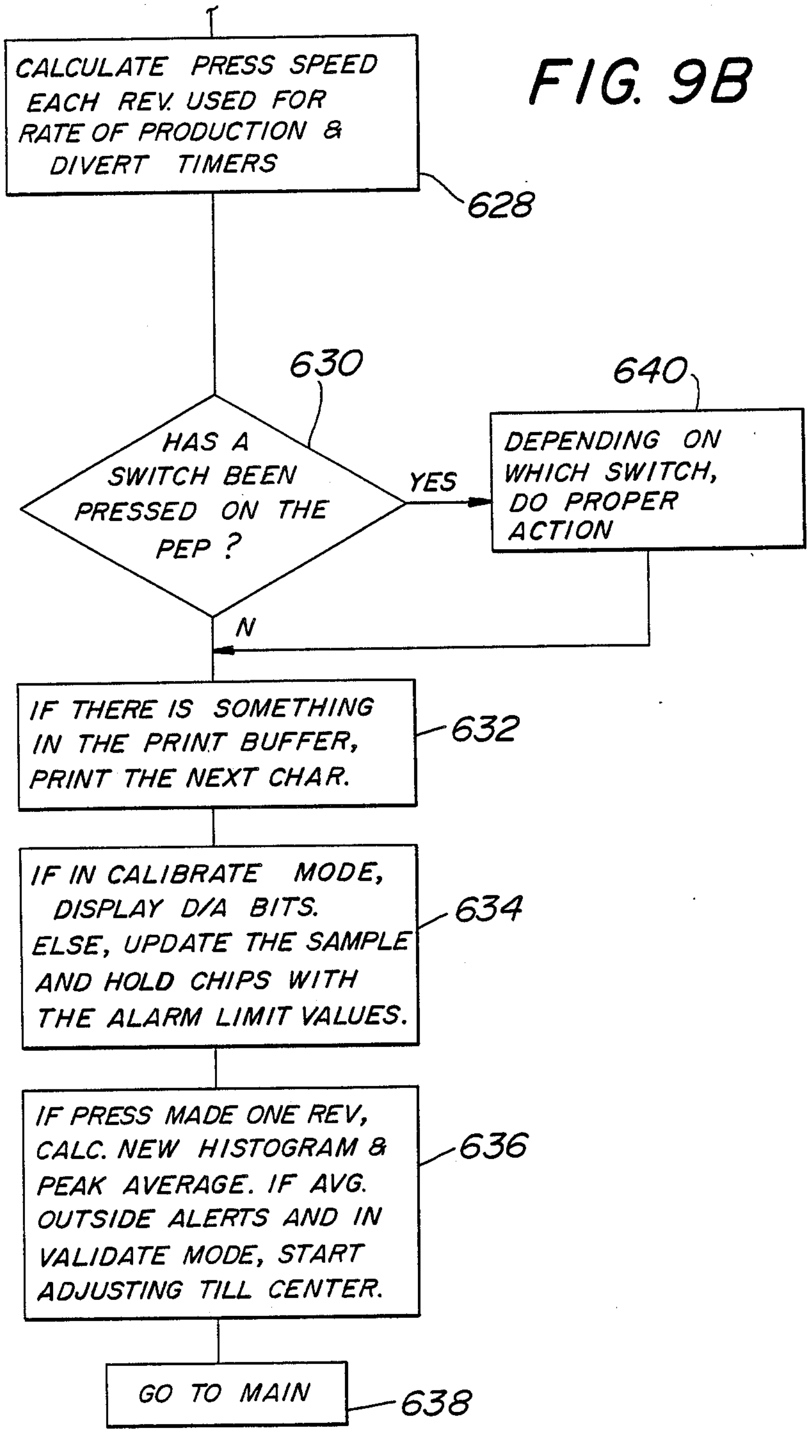

In the running or production mode, software is normally operating under control of the main loop routine 612 (FIGS. 9A and 9B). In the main loop routing 612, control first passes to block 614. As shown, the software first checks to determine if the controller has been in a power fail condition, i.e., whether there was a TRAP interrupt before the last shut down. The software also causes microprocessor 300 to poll inputs PB0–PB7 and PC0–PC3 of I/O port 138 to determine if any of the interlock inputs on lines 270 and 272 (FIG. 2D) have become active. As previously mentioned, if an interlock signal becomes active, this is indicative of an undesirable event such as an increase in operating temperature or pressure of the tablet press. The software is responsive to the detection of an active interlock input to cause output PC3 of I/O port 234 to become active, thus generating the SHUTDOWN output signal. The SHUTDOWN signal is a user selectable signal which may be connected to the press to affect its operation in a predetermined manner. Typically, the SHUTDOWN signal is utilized to automatically shut down the tablet press. However, it may also be used to activate a divert gate associated with the tablet press. Block 614 also checks for STRING or RANDOM ERRORS. A RANDOM ERROR is as follows. Microprocessor 300 keeps a running count of the number of times that the value of the data words (for all of die/punch combinations) exceeds the upper alarm limit and fails to exceed the lower alarm limit. A pre-established maximum RANDOM COUNT of the number of times that the values may fall outside of the alarm limits is set by the operator via the PEP panel. If, during a preselected BATCH COUNT size, the RANDOM COUNT reaches the pre-established count set by the operator, then the software causes the SHUTDOWN output signal to occur. Again, the SHUTDOWN output signal is user selectable and may be used to either shut down the press or activate a divert gate.

The STRING ERROR is as follows. Microprocessor 300 also maintains a STRING COUNT of the number of times that the value of the data word for one or more particular die/punch combinations causes an alarm condition. A preestablished maximum STRING COUNT is set by the operator via the PEP panel and represents the maximum number of times the value of a data word associated with a particular die/punch combination may cause an alarm condition. If the tallied STRING COUNT reaches the pre-established STRING COUNT set by the operator, the SHUTDOWN output signal is again provided.

The RANDOM and STRING counters are reset at the beginning of each new batch run.

As shown in block 614, whenever the SHUTDOWN signal is provided because of the occurrence of any of the POWER FAIL, INTERLOCK, STRING or RAMDOM errors, the nature of the occurrence is displayed on the PEP panel to alert the operator of the precise condition which caused the shutdown to occur.

Control next passes to block 616. As previously explained, if the software detects any of the above mentioned errors, the SHUTDOWN output is activated. On the other hand, if there was previously a SHUTDOWN signal and the condition which caused that shutdown signal had been corrected, the software deactivates the SHUTDOWN output signal.

Control next passes to block 618, where the software determines if the press is rotating. This is accomplished by checking if the front or back proximity probe signal is occurring within regular pre-established time intervals. If the software determines that the press head is not turning, it will cause outputs PC3 and PC4 on I/O port 234 to become active, thus providing the front and back MONITOR output signal. As previously explained, the MONITOR output signal is typically used to activate a divert gate. Control next passes to block 620. In block 620, microprocessor 300 reads the time provided by clock/calendar 258 via I/O port 232. If microprocessor 300 determines that 10 seconds has elapsed since the last time it read clock/calendar 258, it updates the time being displayed on the PEP panel.

Blocks 622, 624 and 626 relate to "housekeeping" functions associated with the printer. For example, the operator may desire to obtain a printout showing the number of tablets produced so far, the average compression force and the distribution (histogram) of compression forces between the upper and lower alarm limits. A printer associated with the controller performs these functions. At block 622, the printer que is loaded with the appropriate data to enable the printer to print the desired information.

It may be desired to provide an automatic print out of certain production data, including the number of tablets produced, the average rate of production, the upper and lower alarm limit settings and upper and lower alert limit settings, and the distribution (histograms) of the compression forces between the upper and lower alarm limits. The automatic printout may occur in response to the BATCH COMPLETE signal. The controller instructs the printer to print such data at the completion of a batch (i.e. when the batch count has been reached). At block 624, the software checks to see if a batch is complete, and if so, begins to set up the printer que to print this data. At block 626, the software continues to send data to the printer if it is available.

Control next passes to block 628. At block 628, the software calculates the press speed. The press speed is used to determine the production rate of tablets and is also used in a manner disclosed hereinbelow to control the operation of the divert gates. Press speed is calculated using the 4 msec. interrupt generated by the timer in I/O port 132. Thus, press speed can be calculated by counting the number of 4 msec. intervals between subsequent proximity probe signals or, by counting the number of 4 msec intervals between subsequent tool no. 1 proximity probe signals. As shown in block 628, the press speed is updated every revolution of the tablet press.

Control next passes to block 630 where the software checks to determine if any of the switches on the PEP panel have been depressed. If a switch has been depressed, control passes to block 640 where the software deciphers the particular command represented by that switch. Thus, for example, the depressed switch might represent a PRINT command wherein the software would, on the next pass through the main loop, execute the commands indicated at block 622 to print data. Alternatively, the depressed switch could represent a SAMPLE command which would close the divert gate for one complete revolution of the tablet press. During the SAMPLE time, output PB2 of I/O port 234 would be active, thereby supplying the SAMPLE command, which would hold the diverter gate in divert postion for one full revolution of the tablet. The "SAMPLE" command is useful for quality control purposes where it is desired to obtain a number of tablets for analysis during a production run. Control then passes to blocks 632 where the printer is instructed to print if there is data in the print buffer.

Control next passes to block 634. At this time, the software determines if the controller has been placed in the CALIBRATE mode. If the controller is in the calibrate mode, the hereinbefore mentioned 12-bit digital representation of the zero and span adjustments are displayed on the PEP panels for readjustment, if desired. If the controller is not in the CALIBRATE mode but is in the MONITOR or VALIDATE mode, the controller refreshes the SHM's 192–198 using the alarm limits previously entered into the controller's memory. Control then passes to block 636 where the software determines if the press has made at least one complete revolution. The completion of a revolution is determined in procedure interrupt routine 5.5 by checking for the occurrence of the tool no. 1 proximity probe signal. A software flag is set if that interrupt routine determines that the tool no. 1 signal has occurred. Block 636 checks to see if that flag has been set. When the software detects that the tool no. 1 flag has been set, several events take place, as shown in block 636. First, the software accumulates all of the data words acquired for each die/punch combination during the preceeding complete revolution and computes the average value thereof. (The values from the front and back presses are segregated and independent averages are computed for the front and back.) These average values represent the average compression forces applied by the front and back compression stations during the preceeding revolution of the press. These average compression forces are compared to the upper and lower alert limits. If an average value exceeds the upper alert limit, then the appropriate one of outputs PB5 (front high ALERT) or PB7 (back high ALERT), or both, become active, thereby providing either or both of the front high ALERT output signals. On the other hand, if an average value has failed to exceed a lower alert limit programmed by the operator, then the appropriate one or both of the PB4 (front low ALERT) or PB6 (back low alert) outputs of I/O port 234 become active to provide the front and/or back high ALERT output signals.

As previously mentioned, the high ALERT output signal causes a die fill adjust mechanism associated with the press to decrease the amount of powder fill in the die cavities while the low ALERT signal causes the die fill adjust mechanism to increase the amount of fill in the die cavities. The high and low ALERT output signals are pulses of programmable pulse width. The pulse width is established by the operator in 100 msec increments up to a maximum of ten seconds. Thus, the ALERT output signals may have a pulse duration of anywhere from 100 msec to 10 seconds, depending upon what the operator has programmed. The ALERT output signals therefore remain active for that programmed time interval and the amount by which the powder fill level is altered (i.e., increased or decreased) corresponds to the pulse duration programmed by the operator. When the software detects that the average value of the compression force computed during the preceding revolution of the tablet press has exceeded the upper ALERT limit or has failed to exceed the lower ALERT limit, the appropriate ALERT output signal (pulse) is provided once during each subsequent revolution of the tablet press until the computed average reaches a center value, i.e., it is midway between the upper and lower ALERT limits. Thus, on each revolution the powder fill level will be adjusted by an amount corresponding to the pulse duration (i.e., increased if low ALERT and decreased if high ALERT) until the average compression force reaches a center value.

Also as shown at block 636, the software computes a histogram-like representation of the distribution of the compression forces measured during the preceding revolution of the press. As shown in FIG. 12, there is a histogram-like display having N class intervals, where N is the number of categories into which the compression signal is classified by the monitor means 64, 66 or 68, 70. In the illustrated histogram-like display there are 20 class intervals corresponding to the 20 comparators in the monitor means. There is a histogram-like display 372 for the front portion of the press and a histogram-like display 374 for the back portion of the press. Each display 372, 374 contains 20 divisions or class intervals. Each class interval is represented by a "." or a "x". To the left of the histogram-like display is the number "500" which represents the programmed value of the lower ALARM limit and the lower bondary of the histogram. To the extreme right of the display is the number "600" which represents the programmed value of the upper ALARM limit and the upper boundary of the histogram. Midway between the display is the number 535 which is a value indicative of the the average compression force, and is relative to the upper and lower ALARM limits. Above the display are the numbers "310" and "510" which, for this example, represent the programmed settings of the upper and lower ALERT limits respectively. It will be appreciated that controller 10 may use this histogram data to provide a hard-copy printout which numerically shows the distribution of the compression forces.

For the front portion of the press, the histogram operates in the following manner, it being understood that the back portion operates in identical fashion. The passage of each die/punch combination through the compression station 50 causes a data word to be held in the latch circuits 98. The occurrence of the front proximity probe signal causes microprocessor 300 to read that data word and store it in a memory location. Each die/punch combination is assigned a different memory location such that, at the completion of one full revolution of the tablet press, a data word for each die/punch combination is stored in memory. The value of each data word is indicative of the maximum compression force experienced by the associated die/punch combination when it passed through compression station 50 during the preceding revolution of the tablet press. Since the value of the data word read by the microprocessor 300 is a direct indication of the highest category of the twenty categories into which the compression signal is classified, software can determine which class interval in the histogram-like display 372 that value should be categorized. For example, the highest category 376 into which the sinusoid 356 was classified (FIG. 11) is category 14. Therefore, in FIG. 12, the software would categorize this data word in the 14th class interval or division by placing a "X" at that class interval or division as shown at 373. Also, as shown, there are "X"'s in other class intervals or divisions of the histogram-like display 372, which together represent the distrbution of the data words (compression forces) read during the preceding full revolution of the press. Thus, the histogram-like display 372 provides the operator with a substantially instantaneous display of the distribution of compression forces relative to the upper and lower alarm limits.

After the software has completed updating the histogram display, control passes to block 368 which returns control back to the beginning of the main loop 612.

The software continues to execute the main loop 612 until an interrupt from either the front or back proximity probe or the 4 msec. timer occurs. The effect of each of these interrupts will now be considered.

The rising edge of the front proximity probe signal 368 occurs on line 16 and sets flip/flop 156, thereby interrupting microprocessor 300 via the RST 5.5 interrupt input. The RST 5.5 interrupt is a vectored interrupt and vectors software control to the procedure interrupt 5.5 routine, reference numeral 524, shown on FIGS. 7A and 7B.

As previously mentioned, the rising edge of the front proximity probe signal 368 is an indication that a maximum compression force has already been applied to a die/punch combination and that this die/punch combination is now exiting the compression station 50. It is also an indication that latch circuits 98 are holding a valid data word, i.e., a data word having a value indicative of the maximum compression force applied to the powder in the die cavity which just passed through the peak compression zone 51. The software is responsive to this event, as shown at block 526 to immediately read the data word stored in latch circuit 98. Microprocessor 300 reads latch circuit 98 in three consecutive read cycles by first reading the data appearing on bus 108, then by reading the data appearing on bus 106, and then by reading the data appearing on bus 104. Since only the bits on bus **104*b* are valid, (the bits on 104*a* correspond to the back compression station), the bits on bus 104*a* are masked out by a software routine when bus 104 is read. As will be appreciated by those skilled in the art, microprocessor 300 reads the status of latch circuits 98 in three consecutive read cycles sequentially gating tri-state buffers 118, 116 and 114 via commands on lines 130, 128 and 126. The 20-bit data word just read by microprocessor 300** is stored in a memory location.

Figure 6:
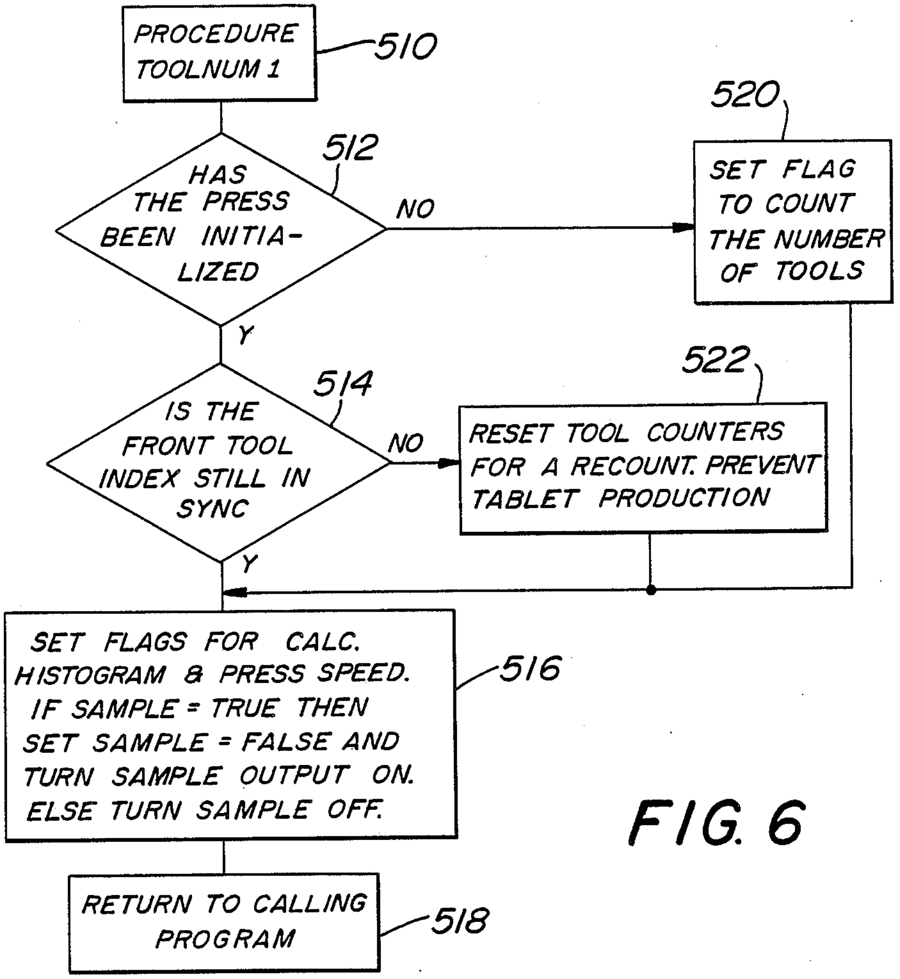

Control next passes to block 528 where the software determines whether the metal tag 58 is in position in front of the tool 1 proximity probe. This is done by polling flip/flop 162 via input PC0 of I/O port 132. If input PC0 is a logic "1", then tool no. 1 is in position in the compression station 50 and software control passes to the subroutine entitled TOOLNUM 1, as shown in FIG. 6. However, if tool no. 1 is not in position, control passes to block 530.

At block 530, the software determines whether the controller is in the "production mode", whether the press is running (which is determined from the clutch engaged input) and whether the data word which has just been read by microprocessor 300 is for a valid die/punch combination. That is, it is possible the punch for this die/punch combination is broken or missing, in which case it is not desired to process the data word which has just been read by microprocessor 300. To this end, the controller 10 contains means, hereinafter referred to as "punch bypass means" for signalling the microprocessor that one or more selected punches are broken or have been removed, and that the data word generated by that die/punch combination should not be processed by the microprocessor 300. This is done in the following manner. Each successive die/punch combination is assigned a successive number, beginning with the die/punch combination adjacent metal tag 58, which is assigned the number 1 (see FIG. 4). The next die/punch combination in sequence which will pass under the compression station 50 is designated by the number 2. The last punch in sequence, which is adjacent to die/punch combination no. 1 is designated as die/punch combination no. M (in the Figure shown M is equal to 65).

The operator designates, by entering the appropriate die/punch numbers or designations in the PEP panel, those die/punch combinations that should be ignored by the controller 10. Those designations are stored in memory for later use. While the press is running, the controller keeps track of which die/punch combination is currently undergoing compression, by incrementing a TOOL INDEX counter every time the front proximity probe signal occurs. The TOOL INDEX counter is reset when the signal from the tool 1 proximity probe occurs. In this manner, microprocessor 300 "knows" which die/punch combination is currently passing through the compression station and detects if this die/punch combination is one that has been designated as missing. Thus, if the number of the die/punch combination passing through the compression station 50 coincides with any of the designations entered by the operator and stored in memory, the data word held by the latch circuits is not further processed by the microprocessor 300. It will be appreciated that data words corresponding to "missing" tool stations are not included in the computation of the average compression force or the generation of the histogram-like display.

Returning now to block 530 (FIG. 7A), if the controller is in the PRODUCTION mode, and the press is running (which is determined from the clutch engaged input 65) and the data word which has just been supplied is not associated with a missing die/punch combination, then control passes to block 532. If the front MONITOR divert output had previously been active, it is deactivated by deactivating output PC3 at I/O port 234.

Figure 7A:
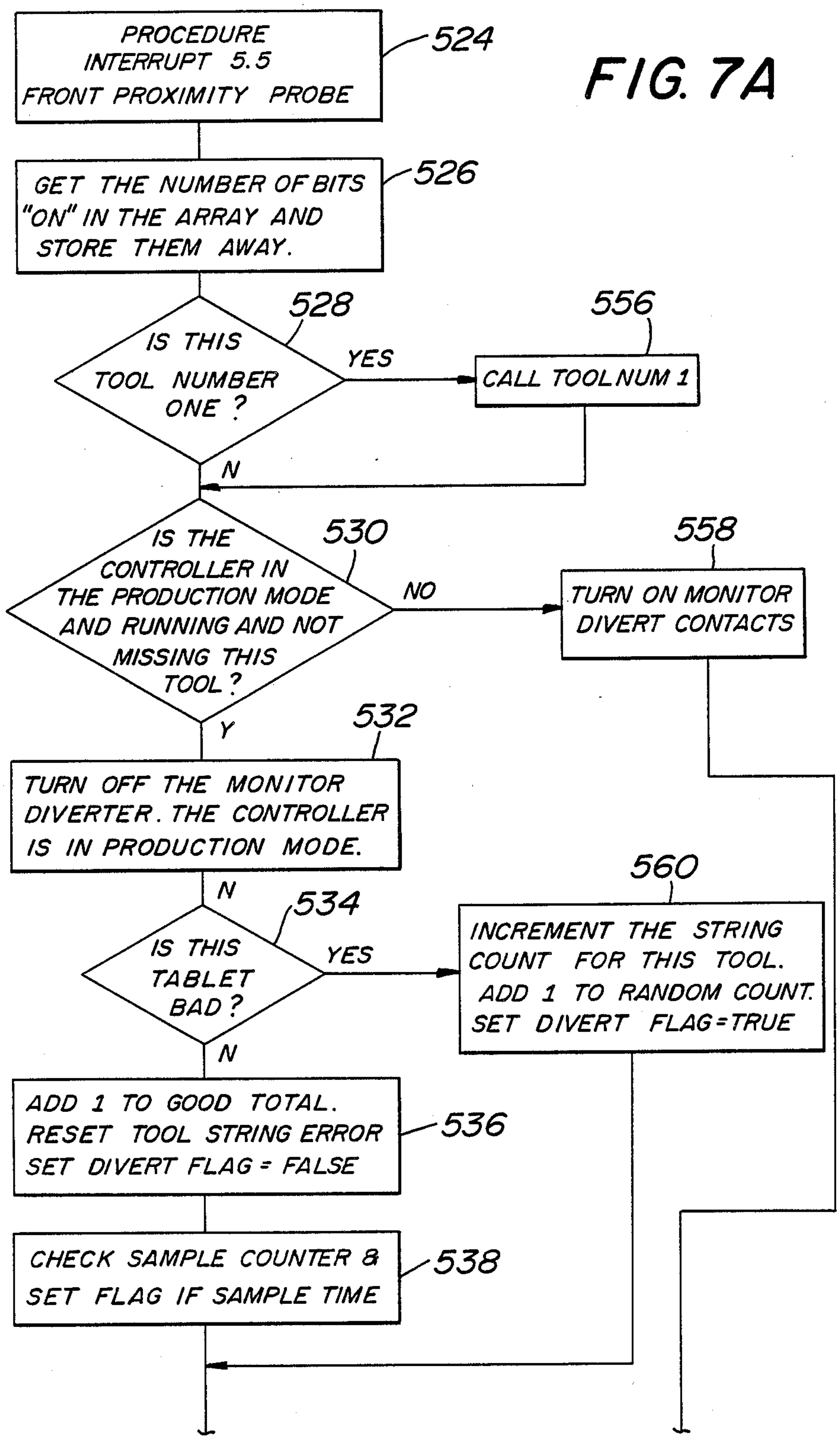
Figure 7B:
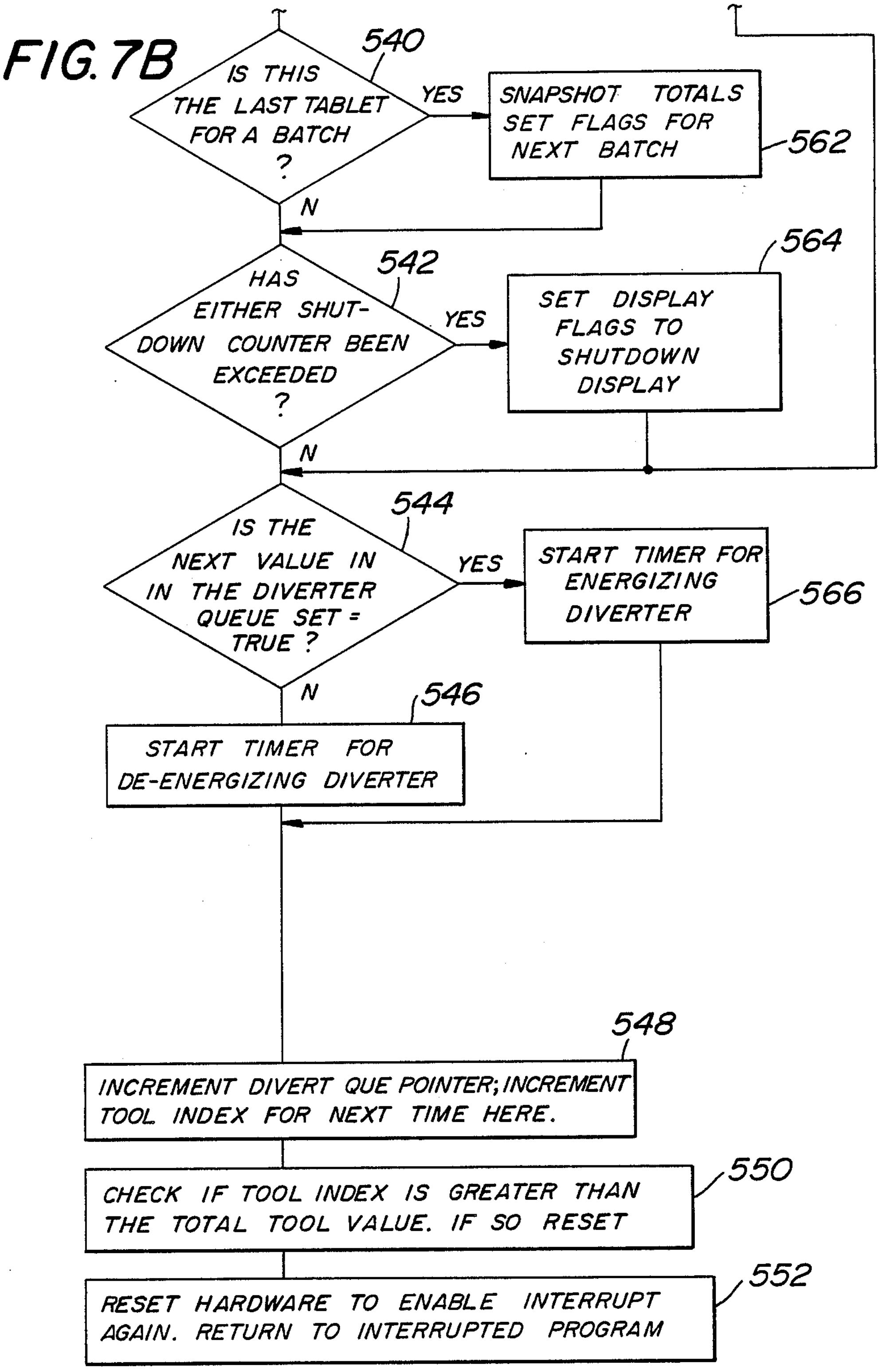

If, during execution of the instructions associated with block 530, the software had determined that the controller was either not in the production mode, or was not running (i.e., the clutch engaged input indicates the clutch is disengaged), control would pass to block 558 which would activate the front MONITOR output signal to energize the divert GATE. Thus, all tablets manufactured by the tablet press would be diverted from the primary collection bin. Thereafter, control passes from block 558 to block 544 (FIG. 7B).

Assuming that the controller is in the PRODUCTION mode and is running and a die/punch tool is not missing, control passes directly to block 534. At block 534, the software determines whether the value of the data word has either exceeded the upper alarm limit or has failed to exceed the lower alarm limit. If either condition exists, this tablet is designated as a "bad" tablet which should be diverted (rejected). Moreover, if the tablet is "bad", the STRING COUNT tally for this die/punch combination is incremented by one and the RANDOM COUNT tally is also incremented by one. Control next passes to block 540.

Assuming that the tablet just manufactured is not "bad", control passes to block 536 where the "BATCH COUNT" is updated. The BATCH COUNT may be a software counter which is incremented by one each time the front or back proximity probe signal occurs and a "good" tablet is produced. Preferably, the BATCH COUNT counters for the front and back presses are independent and responsive only to their respective compression station.

Turning back now to block 536, as previously mentioned, the BATCH COUNT is incremented by one if the data word just read is for a "good" tablet. The divert flag is set to a false (off) condition, indicating that no tablets are to be diverted. Thus, when the divert flag is false (off), the Q output of latch 242, and thus the front divert output signal, is inactive.

Control then passes to block 538 where a SAMPLE counter is checked to determine if the SAMPLE output should be provided. The operation of the SAMPLE counter and SAMPLE output are as follows.

It is desirable during a production run to obtain samples from the batch of tablets being produced for quality control purposes. It is further desirable that the number of sample tablets taken from the batch not be computed in the BATCH COUNT, since the SAMPLE tablets are seldom returned to the primary collection bin. Therefore, means are provided to allow the operator to enter, via the PEP input panel, the number of times during a production run that he would like sample tablets to be supplied for quality control purposes. For example, assume that an operator had previously entered a BATCH COUNT of 100,000 tablets. Further assume that the operator instructed the controller to enter four SAMPLE runs during the production run of the 100,000 tablets. The controller will automatically space the sample runs throughout the batch by entering the SAMPLE mode after the completion of each 20,000 tablets, i.e. at 20,000, 40,000, 60,000 and 80,000 tablets. The SAMPLE counter is reset at the beginning of each batch and is incremented each time a "good" tablet is formed and sets a SAMPLE flag when the value in the SAMPLE counter reaches a SAMPLE interval, i.e., 20,000, 40,000, 60,000 or 80,000 in this example. During each SAMPLE mode, the controller causes output PB2 of I/O port 234 to become active, thus generating the SAMPLE output. The SAMPLE output remains active for one complete revolution of the press and is typically used to divert tablets to a separate collection bin. Thus, in a standard 65 station tabletting press, 65 sample tablets will be produced during each SAMPLE run. As previously mentioned, these tablets are not included in the BATCH COUNT maintained by the controller. After one complete revolution, the controller will automatically revert back to the production mode.

As indicated at block 538, if it is time for a sample, a flag is set, causing the SAMPLE output to become high for one complete revolution of the tablet press.

Control next passes to block 540 which compares the count of the number of tablets currently produced for this production run against BATCH COUNT entered by the operator. If the tablet count equals the BATCH COUNT, control passes to block 562 which, for the front portion of the press, provides the front BATCH COMPLETE SIGNAL via PB0 output of I/O port 234. The BATCH COMPLETE SIGNAL is a user selectable output, but typically is used to activate a divert gate so that the next batch of tablets are collected in a separate bin.

If the tablet count has not reached the BATCH COUNT, control passes to block 542 which checks to determine whether either the STRING or RANDOM count has been exceeded. If either the STRING or RANDOM count has been exceeded, control passes to block 564. Block 564 sets flags to cause the PEP to display the STRING or RANDOM error condition. Moreover, a flag is set which causes the SHUTDOWN output signal to be provided via the PB3 output of I/O port 234. As previously mentioned, the SHUTDOWN signal is typically used to shut down the tablet press, but may also be used to activiate a separate divert gate to divert tablets away from the primary collection bins.

Control next passes to block 544 which determines whether the DIVERT SIGNAL should be provided. The DIVERT SIGNAL is provided after the software has determined that a "bad" tablet has been produced (i.e. a tablet for which the compression force has exceeded the upper alarm limit or has failed to exceed the lower alarm limit). In detail, the DIVERT control software and timing is as follows.

As is known to those skilled in the art, the divert gate is placed on the downstream side of the compression station by a known distance. According to the present invention, the divert gate is placed on the downstream side of the compression station by a distance corresponding to a pre-established number of die/punch combinations. It is desired to operate the divert gate at the precise time when the "bad" tablet reaches the divert gate so that only the "bad" tablet will be diverted. According to the present invention, during set up of the controller the operator enters, via the PEP display panel, the number of die/tool stations between the compression station and the divert gate. This number, hereinafter referred to as TOOL DELAY is stored in the controller's memory. A circular "divert que" is established in the controller's memory and has a number of memory locations equal to the TOOL DELAY, i.e, equal to the number of die/punch combinations between the compression station and divert gate entered by the operator. A divert que pointer associated with the circular divert que is incremented by one each time an interrupt from the front proximity probe occurs. When a "bad" tablet is detected at the compression station, an entry is made in the memory location of the divert que currently being pointed to by the divert que pointer. After the divert que pointer has made a full "revolution" through the divert que and is again pointing to the memory location where an entry has been made, this indicates that the "bad" tablet has reached the divert gate. Thus, it will be appreciated, that a delay is established between the time that a "bad" tablet is detected and the time that the DIVERT signal is actuated. The DIVERT signal duration substantially corresponds to the time it takes for the next interrupt from the front proximity probe to occur, i.e., the DIVERT signal duration corresponds substantially to the time between the TOOL DELAY and TOOL DELAY+1 counts, as shown in FIG. 10.

It is desirable that there be a type of "speed compensation" to prevent a "good" tablet immediately preceding the "bad" tablet from also being ejected. As shown in FIG. 10, when the TOOL DELAY period D expires, there may be a "good" tablet 348 in front of the divert gate. It is desired to eject only the "bad" tablet 350 and therefore a type of "speed compensation" is desired to delay the actuation of the divert gate until after the "good" tablet 348 has passed. To this end, additional time delays S and L are provided, as shown in FIG. 10. Time delay "S" delays the occurence of the DIVERT signal 354 for a short time until after the "good" tablet 348 has passed the divert gate. Time delay "L" delays the termination of the DIVERT signal 354 until after the bad tablet 350 has been diverted. It will be appreciated that time delays S and L together determine the pulse duration of the divert pulse 354. The operation of this "speed compensation" system is as follows.

After the TOOL DELAY period "D" has expired, an additional time delay S is provided before the DIVERT output becomes active. This time delay is provided to compensate for variations in the alignment of the divert gate which may occur from one press to another. That is, the placement of the divert gate with respect to the compression station and the front (or back) proximity probe may change from press to press, and accordingly the time delays S and L are provided to compensate.

When TOOL DELAY period D expires, a timer in I/O port 138 (I/O port 234 for the back press) begins running. This timer is loaded with a pre-established count which corresponds to the desired time period S. When this timer times out, it sets latch 242 (latch 244 for the back press), thereby providing the DIVERT pulse 354. The time period S is computed to insure that the "good" tablet 348 passes the divert gate before the DIVERT signal 354 is provided.

Another time delay L is provided to compensate for the above-mentioned alignment problem. When TOOL DELAY period D+1 expires, indicating the the "bad" tablet 350 is in the path of the divert gate, a timer in I/O port 136 (I/O port 232 for the back press) begins running. This timer is loaded with a pre-established count which corresponds to the desired time period L. When this timer times out, it resets latch 242 (latch 244 for the back press), thereby terminating the DIVERT pulse 254. The time period L is computed to insure that the DIVERT pulse is provided for sufficient duration to divert the "bad" tablet 350, but not the next "good" tablet 352.

The time periods S and L may be increased or decreased via the PEP keyboard until the timing of the DIVERT pulse 354 is properly phased with respect to the tablet stream and the placement of the divert gate.

The preceding discussion summarizes the events which occur in the blocks 546 and 566 in FIG. 7B.

After the bad tablet has been diverted, software control passes to block 548. As shown at block 548, and as explained previously, the software increments the divert que pointer so that the pointer points to the next memory location in the divert que. Also, at block 548, the TOOL INDEX is incremented. As mentioned previously, the TOOL INDEX determines the number of the next die/punch combination to come into position in the compression station 50.

Control next passes to block 550 where the TOOL INDEX is compared to the total number of tools in the tablet press. Thus, for example, in a 65 punch tablet press, the TOOL INDEX count cannot exceed 65. Thus, after the TOOL INDEX count reaches 65, it is reset to 1.

Control next passes to block 552 which clears flip/-flops 162 and 156 via output PB7 of I/O port 134 in preparation for the next signal from the front proximity probe. At this time, control returns to the main loop.

Figure 8A:
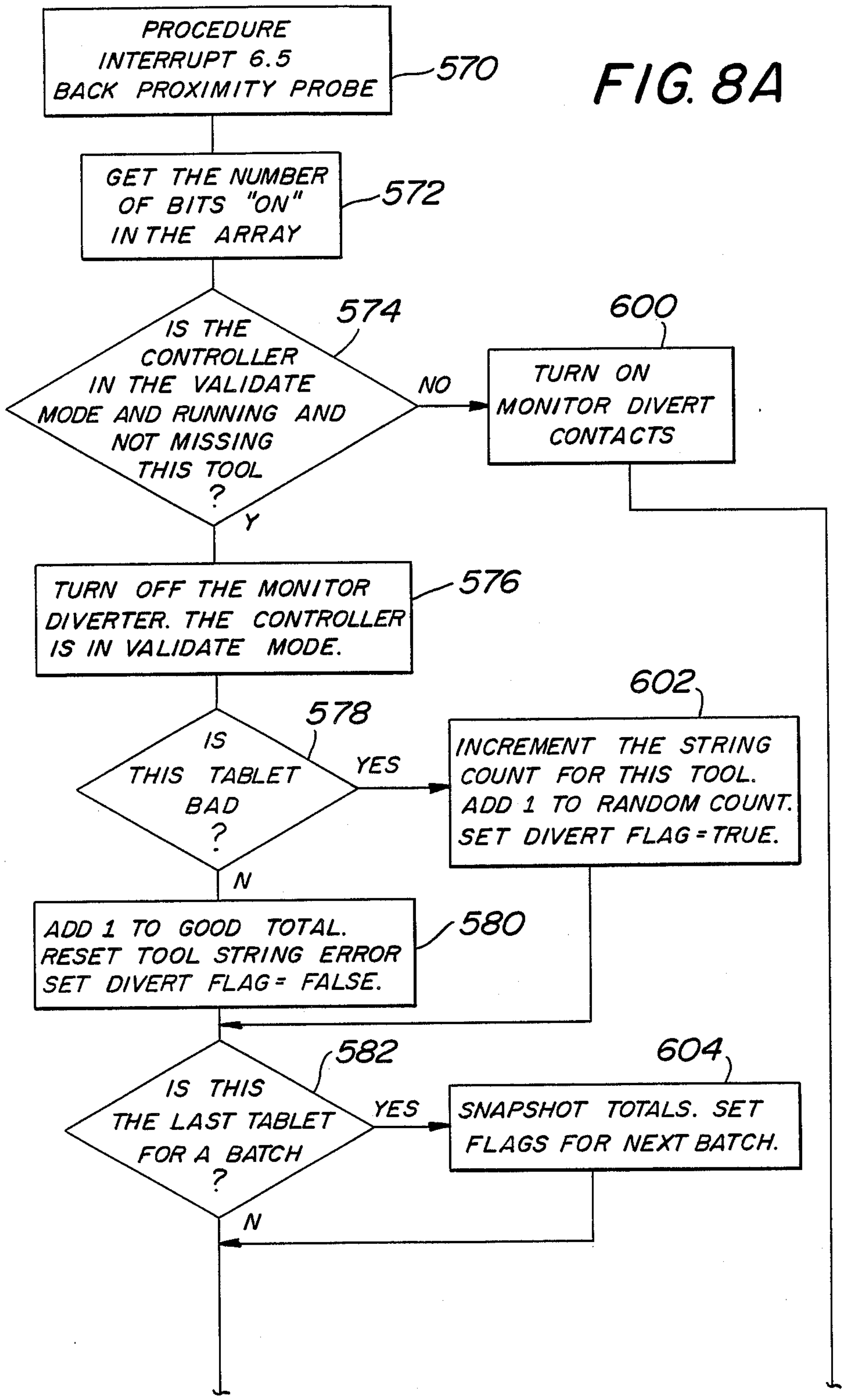
Figure 8B:
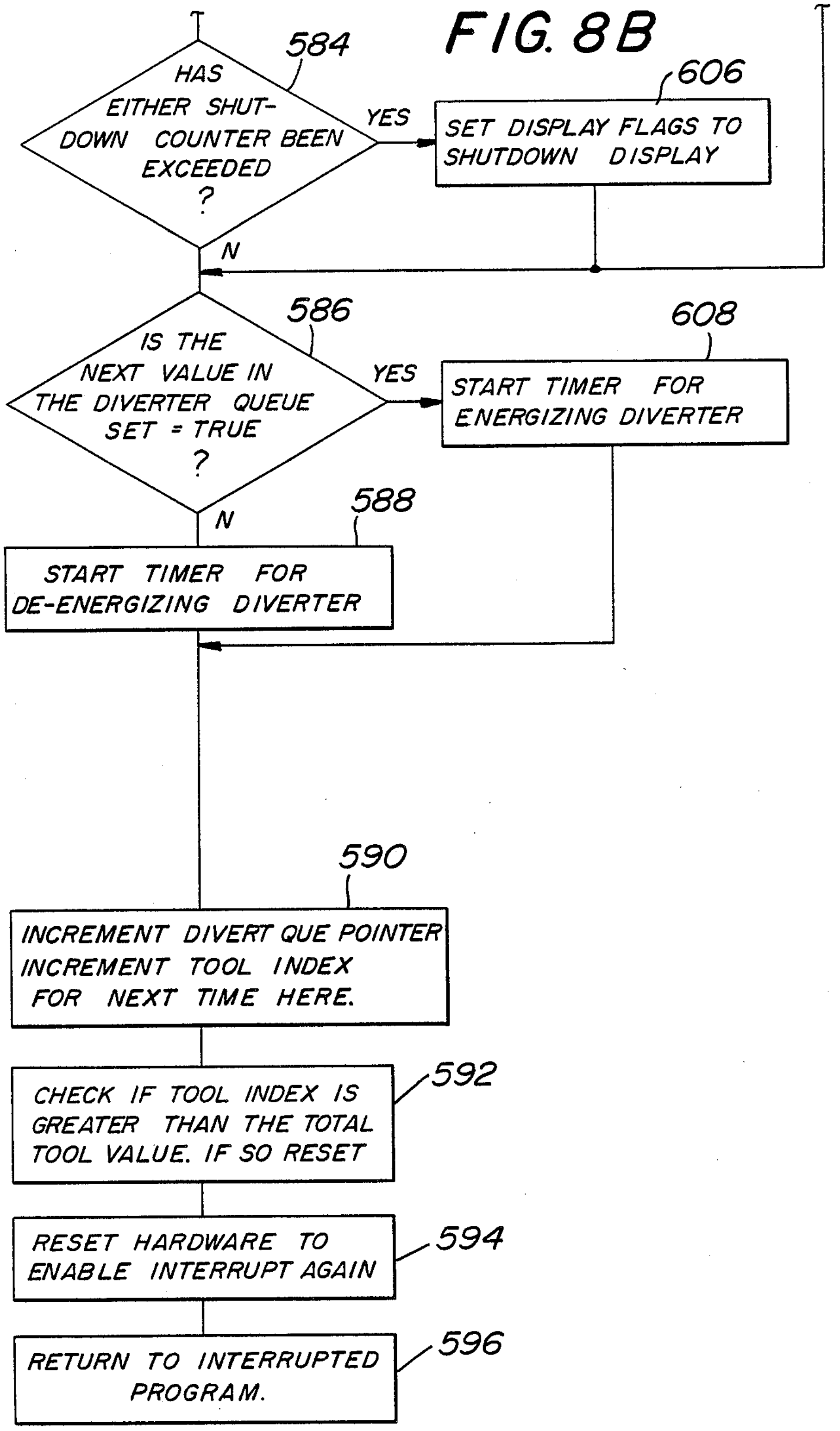

Procedure interrupt 6.5 (reference numeral 570, FIGS. 8A and 8B will now be explained).

The rising edge of the back proximity probe signal on line 18 sets flip/flop 158, thereby interrupting microprocessor 300 via RST 6.5 interrupt input. This interrupt vectors the software to the procedure interrupt 6.5 routine designated as reference numeral 570.

Procedure interrupt 6.5 routine is substantially identical to procedure 5.5 interrupt routine above described. Therefore, the details of procedure interrupt 6.5 routine will not be repeated herein, except as follows. At block 572, the data word stored in latch circuits 96 is read by microprocessor 300. At block 578, if a "bad" tablet is detected, the appropriate ones of the RANDOM and STRING counters are incremented. At block 582, if the tablet count equals the BATCH COUNT, the back BATCH COMPLETE output signal is provided via the PB1 output of I/O port 234.

At block 584, if either of the RANDOM or STRING COUNTS have been exceeded, the SHUTDOWN output is provided via the PB3 output of I/O port 234.

The above discussion relating to divert timing is applicable to the blocks 586, 588 and 608, except that they operate to provide the BACK DIVERT latch 244 using the timers in I/O ports 232 and 234.

Operation of the software illustrated by blocks 590, 592, 594 and 596 corresponds to the operation of the software in blocks 548, 550 and 552 of the interrupt 5.5 routine.

Unlike the procedure 5.5. interrupt routine, the interrupt 6.5 routine does not contain any commands for checking for the presence of the tool no. 1 proximity probe signal.

The operation of the procedure interrupt 7.5 routine will now be explained.

As previously mentioned, the timer in I/O port 132 generates a pulse every 4 msec. This pulse is supplied to microprocessor 300 as an interrupt on the RST 7.5 interrupt input. This interrupt vectors software control to the procedure interrupt 7.5 routine shown in FIG. 5.

Every 4 msec, the procedure interrupt 7.5 routine 500 is entered. At block 502, the PEP display panel is updated by outputting another character from the display buffer to the display panel, if required. Control passes to block 504 which updates the real time clock 258, and other counters which count the passage of time (e.g., the divert timer in I/O ports 136, 138, 232 and 234).

Control passes to block 506 which sounds a solid state beeper associated with the PEP display panel if a character has been depressed. This feature is provided merely as an audible acknowledgement to the operator that a character on the keyboard has been depressed. Thus, at block 506, the PC5 output of I/O port 234 becomes momentarily active, turning on transistor 284, thereby sounding the solid state beeper.

Control then passes to block 508 which returns software control to the program which was being executed before the 4 msec. interrupt occurred.

The operation of the procedure TOOLNUM1 routine will now be explained.

The procedure TOOLNUM 1 is illustrated in FIG. 6. This routine is called by the procedure interrupt 5.5 routine as shown at blocks 528 and 556 thereof.

When procedure TOOLNUM 1 routine is entered, control passes to block 512. The software checks to see if the tool counters, e.g., TOOL INDEX, etc. have been initialized. If these counters have not been initialized, the software is instructed to count the number of tools in the tablet press, by counting and storing the number of front proximity probe interrupts which occur between sequential tool no. 1 proximity probe signals. This is used to determine when the aforementioned TOOL INDEX count should be reset. If the press has been initialized, control passes to block 514. At block 514, the software determines whether the TOOL INDEX counter has been properly incremented during the previous rotation of the press. Thus, in a 65 station tabletting press, the TOOL INDEX count should be 65 when the tool no. 1 proximity probe signal occurs. If the count is less than or greater than 65, this is an indication that there has either been an error in incrementing the TOOL INDEX counter during the preceding revolution, or that the previously stored count of total tool stations in this press is in error. Thus, if the software detects an error at block 514, control passes to block 522 which immediately diverts all tablets by activating the MONITOR output or SHUTDOWN output, as appropriate and a recount of the total number of tool stations in the press is taken. Control thereafter passes to block 516.

At block 516 flags for events which occur on a per revolution basis are reset or set, as appropriate. Thus, the software sets a flag which directs the software to update the histogram-like display and compute the new average compression force based upon the data acquired during the previous revolution. The press speed is also updated, based upon the relative frequency of front proximity probe interrupts obtained from the last revolution. If the SAMPLE output was active during the previous revolution, it is deactivated. On the other hand, if the before mentioned SAMPLE count indicates that the controller should be in the SAMPLE mode during the next revolution, the SAMPLE output is activated.

Control then passes back to procedure interrupt 5.5 routine which initially called the TOOLNUM 1 routine.

A method for establishing and setting upper and lower alarm and alert limits, and which has particular application to the inventive controller, will now be disclosed.

The operator is provided with an "ideal" tablet weight which is the desired average tablet weight that tablets from a production run should weigh. The operator places the controller in the MONITOR MODE and operates the press so that a quantity of tablets are formed. A number of these tablets are weighed and the average weight thereof is computed. If the average tablet weight is substantially different than the "ideal" tablet weight, the powder fill level is adjusted until the press produces tablets having an average tablet weight substantially the same as the "ideal" tablet weight. When an acceptable average tablet weight is obtained, this average weight is recorded as a first average weight. The operator then records the average value of the data words corresponding to these tablets from the PEP display as a first average value.

The powder fill level is altered by an arbitrary amount and the press is again operated with the controller in the MONITOR MODE. A number of the tablets are produced and the average tablet weight thereof is computed and recorded as a second average weight. The average value of the data words corresponding to these tablets is read from the PEP display and recorded as a second average value.

The absolute value of the difference between the first average weight and the second average weight is computed and recorded as a first difference. Similarly, the absolute value of the difference between the first average value and the second average value is determined and recorded as a second difference. Then, the first difference is divided by the second difference and the quotient thereof is recorded as a constant, K.

The operator is supplied with tolerances which define a band or range within which tablet weights must fall to be considered acceptable tablets. The tolerances are typically supplied as percentages, indicating the percentage by which tablet weight may vary from the "ideal" tablet weight and still be considered acceptable. To this end, the operator is supplied with a first percentage which defines the absolute maximum and minimum weight limits of acceptable tablets. These correspond to the alarm lights. The operator is also supplied with a second percentage which is less than the first percentage and which defines upper and lower weight limits falling within the band defined by the absolute maximum and minimum weight limits. These correspond to the alert limits.

Maximum and minimum acceptable tablet weights are computed and recorded based upon the first percentage and the "ideal" tablet weight. Upper and lower tablet weights are computed and recorded based upon the second percentage and the "ideal" tablet weight.

Typically, the first percentage is 5 percent and the second percentage is 3 percent. Thus, for example, if the "ideal" tablet weight is 100 mg, the maximum tablet weight will be 105 mg and the minimum tablet weight will be 95 mg. The upper tablet weight will be 103 mg and the lower tablet weight will be 97 mg.

The maximum tablet weight is divided by the constant K and recorded as the upper alarm limit. The minimum tablet weight is divided by the constant K and recorded as a lower alarm limit.

The upper tablet weight is divided by the constant K and recorded as an upper alert limit. The lower tablet weight is divided by the constant K and recorded as the lower alert limit.

It will be appreciated that the values of the upper and lower alarm and alert limits obtained as a result of the above method will be relative values. The values are not a direct indication of tablet weight per se, but instead define upper and lower limits with respect to a relative "ideal" weight. These values may be programmed into the controller's memory via the PEP keyboard for use in operating the controller.

The present invention may be embodied in other specific forms without departing from the spirit or essential attributes thereof and, accordingly, reference should be made to the appended claims, rather than to the foregoing specification, as indicating the scope of the invention.

We claim:

1. A controller for a tablet press having at least one die/punch combination, at least one compression station for applying a compression force to a quantity of powder fill in the die, a zone where a maximum compression force is applied to the powder fill, and means for generating a compression signal having a magnitude indicative of the magnitude of the compression force, the controller comprising:

(a) monitor means for receiving and monitoring the compression signal and continuously providing, during at least the time the compression force is being applied, a data word having a value indicative of the magnitude of the compression signal;

(b) latch means for holding the highest value data word provided by the monitor means, the data word held by the latch means defining a latched data word;

(c) data processing means for reading the latched data word, processing the latched data word in a preestablished manner, including detecting if the value of the latched data word has exceeded or failed to exceed pre-established limits, and providing tablet press control signals for controlling the operation of the tablet press; and (d) proximity signal input means for receiving and monitoring a proximity signal provided by the tablet press when the die/punch combination exits the maximum compression zone, and further for providing an indication of the occurence of the proximity signal to the data processing means, the data processing means being responsive to the occurence of the proximity signal to read the latched data word.

2. A controller according to claim 1 wherein the tablet press is a rotary tablet press having a plurality of die/punch combinations and the tablet press provides a synchronizing signal whenever the press has completed a full rotation, the controller further comprising synchronizing signal input means for receiving and monitoring the synchronizing signal and providing an indication of the occurrence of the synchronizing signal to the data processing means, the data processing means being responsive to the occurrence of the synchronizing signal to compute the average value of the latched data words read during the preceding full rotation of the tablet press and to provide powder fill control signals to the tablet press to alter the quantity of powder fill in the dies when the average value exceeds or fails to exceed the pre-established limits.

3. A controller according to claim 2 wherein the pre-established limits comprise programmable upper and lower alert limits and the powder fill control signals comprise first and second powder fill adjust pulses of programmable pulse width for incrementally altering the quantity of powder fill in the dies by an amount corresponding to the pulse width, the first powder fill adjust pulse being provided during each revolution of the press to increase the quantity of powder fill in the dies when the average value fails to exceed the lower alert limit, the second powder fill adjust pulse being provided during each revolution of the press to decrease the quantity of powder fill in the dies when the average value exceeds the upper alert limit, the appropriate powder fill adjust pulses being provided until the average value falls midway between the pre-established limits.

4. A controller according to claim 2 further comprising bypass means for signalling the data processing means that selected latched data words corresponding to selected die/punch combinations should not be processed, the data processing means being responsive to the bypass means so as not to process the selected latched data words.

5. A controller according to claim 3 wherein the pre-established limits further comprise upper and lower alarm limits wherein the upper alarm limit is greater in value than the upper alert limit and the lower alarm limit is lower in value than the lower alert limit, and the data processing means provides a tablet divert control signal to a divert gate system associated with the tablet press when the value of the latched data word exceeds the upper alarm limit and when the value of the latched data word fails to exceed the lower alarm limit, the tablet divert control signal comprising a divert pulse of pre-established pulse width for actuating the divert gate for a time period corresponding to the pulse width of the divert pulse.

6. A controller according to claim 5 wherein the divert gate is located on the downstream side of the compression station and there is a distance between the divert gate and the compression station, the controller further comprising means for establishing a time delay between the time that the data processing means detects that the value of the latched data word has either exceeded the upper alarm limit or has failed to exceed the lower alarm limit and the time the divert pulse is provided, the time delay substantially corresponding to the time required for a pre-established number of die/punch combinations to travel from the compression station to the divert gate.

7. A controller according to claim 6 wherein the distance between the divert gate and the compression station substantially corresponds to a predetermined number of die/punch combinations, the means for establishing a time delay comprising:

(a) means for entering a count of the number of die/-punch combinations between the compression station and the divert gate;

(b) means for keeping count of the number of die/-punch combinations which have passed through the compression station since the data processing means has detected that a latched data word has exceeded the upper alarm limit or has failed to exceed the lower alarm limit;

(c) means for providing the divert pulse when the count of the number of die/punch combinations which have passed through the compression station reaches the count of the number of die/punch combinations between the compression station and the divert gate.

8. A controller according to claim 5 further comprising counter means for keeping count of the number of times that the value of latched data words has exceeded the upper alarm limit and has failed to exceed the lower alarm limit and providing a user selectable control signal for affecting the operation of the press in a predefined manner when the count reaches a first pre-established maximum count.

9. A controller according to claim 8 wherein the user selectable control signal is effective to halt the operation of the press.

10. A controller according to claim 8 wherein the counter means comprises at least one string counter for counting the number of consecutive times that the value of latched data words corresponding to selected die/-punch combinations has exceeded the upper alarm limit and failed to exceed the lower alarm limit, the user selectable control signal being provided when the count in the string counter reaches a second pre-established maximum count.

11. A controller according to claim 1 wherein the monitoring means comprises classification means for classifying the compression signal into ones of N successive categories, where N is a integer greater than 2, there being a lowermost category representing a lower pre-established limit, an uppermost category representing an upper pre-established limit, and a range of categories therebetween, the classification means having N discrete outputs providing an N bit digital word indicative of the category into which the compression signal is classified, the N bit ditigal word being the data word provided by the monitoring means.

12. A controller according to claim 11 wherein the classification means comprises a plurality, N, of comparators, each comparator having first and second inputs and a single output, each of the first inputs being connected together in common to receive the compression signal, each of the second inputs being connected to a successive stage of a multi-stage voltage divider having at least N−1 stages and having an uppermost stage connected to a first reference voltage and a lowermost stage connected to a second reference voltage, the first reference voltage being greater than the second reference voltage, each comparator providing a logic 1 output when the magnitude of the compression signal applied at the first input thereof exceeds the magnitude of voltage applied at the second input thereof, and the latch means comprises a plurality, N, of digital latch circuits, each comparator output being connected to the input of a different one of the latch circuits, each latch circuit holding the logic 1 when it appears at its respective comparator output, the latch circuits collectively providing the latched data word.

13. A controller according to claim 12 wherein the tablet press is a rotary press and the die/punch combination rotates through the compression station, the controller further comprising means responsive to a signal from a proximity device associated with the press for signalling the data processing means that the die/punch combination has begun to exit the compression station, the data processing means being responsive to the signal from the proximity device to read the latched word held by the latch circuits.

14. A controller according to claim 12 comprising means for generating a histogram-like representation of the distribution of the values of the latched data words the histogram-like representation having N class intervals bounded by the pre-established limits, and further comprising means for displaying the histogram-like representation.

15. A controller according to claim 12 further comprising:

(a) keyboard means associated with the data processing means for entering the upper and lower pre-established limits, the data processing means converting the entries into first and second digital numbers representative of the upper and lower pre-established limits respectively;

(b) digital to analog conversion means for converting the first and second digital numbers into corresponding first and second analog voltages;

(c) first sample and hold means operable under control of the data processing means for selectively receiving and holding the first analog voltage, the first analog voltage being applied to the uppermost stage of the voltage divider and being the first reference voltage;

(d) second sample and hold means operable under control of the data processing means for selectively receiving and holding the second analog voltage, the second analog voltage being applied to the lowermost stage of the voltage divider and being the second reference voltage.

16. A controller according to claim 12 further comprising means for adjusting the first and second reference voltages to define a voltage range, the voltage range being selected to embrace the highest and lowest acceptable magnitude of the compression signal, the latched data word having a resolution defined by the quotient of the difference between the first and second reference voltages divided by N.

17. A controller according to claim 1 further comprising:

(a) means for setting a count of the desired number of tablets to be formed;

(b) means for maintaining a count of the number of tablets which have been formed;

(c) means for providing a user selectable output signal for affecting the operation of the press in a predefined manner when the count of the number of tablets formed reaches the count of the desired number of tablets.

18. A controller according to claim 1 wherein the tablet press provides a plurality of interlock signals each changeable between first and second states when an associated critical operating parameter has been exceeded, the controller further comprising means for receiving the interlock signals and signalling the data processing means when any of the interlock signals change from the first state to the second state, the data processing means being responsive to provide a user selectable control signal for affecting the operation of the press in a predefined manner.

19. A controller according to claim 17 wherein the user selectable control signal is effective to actuate a divert gate associated with the press, the divert gate being effective to change the path of travel of tablets manufactured by the press.

20. A controller according to claim 18 wherein the user selectable control signal is effective to halt the operation of the press.

21. A controller according to claim 1 wherein the press is a rotary tablet press having a divert gate associated therewith for diverting tablets from a first path to a second path, further comprising means for actuating the divert gate for at least one revolution of the press at selected intervals.

22. A rotary tablet press having a plurality of die/punch combinations rotatable through at least one compression station for applying a compression force to a quantity of powder fill in each of the dies, the compression station having a zone where a maximum compression force is applied, the tablet press comprising:

(a) means for generating a first signal having a magnitude continuously indicative of the magnitude of the compression force, the first signal having a peak magnitude indicative of the magnitude of the maximum compression force;

(b) means for generating a second signal for indicating that a die/punch combination has begun to exit the compression station and is no longer in the maximum compression zone;

(c) means for monitoring the first signal and generating and holding a data word for each die/punch combination rotating through the compression zone, each data word having a value indicative of a peak magnitude of the first signal;

(d) data processing means responsive to the second signal for reading and storing each data word, the data processing means processing the data word in a pre-established manner, including detecting if the value of the data word has exceeded or failed to exceed pre-established limits, and providing press control signals to control the operation of the press.

23. A tablet press according to claim 22 wherein the first signal is substantially sinusoidal and the means for monitoring the magnitude of the first signal and generating and holding a data word for each die/punch combination rotating through the compression zone comprises:

(a) classification means for classifying the first signal into one or more of N successive categories, where N is an integer greater than 2, each successive category being assigned a successively increasing value, the classification means classifying the first signal during at least the positive going portion of the sinusoid, the number of categories into which the first signal is classified at any time being an indication of the magnitude of the first signal at that time; and (b) latch means for providing and holding an N bit digital word indicative of the highest category into which the first signal has been classified, the N bit digital word being the data word.

24. A tablet press according to claim 23 wherein the classification means comprises N comparators and the latch means comprises N digital latch circuits, each comparator having a first input, a second input and an output, each of the first inputs being connected in common to receive the first signal, each of the second inputs being connected to a successive stage of an at least $N-1$ stage voltage divider connected between first and second reference voltages, each comparator output being connected to the input of a different one of the latch circuits, the latch circuits holding the outputs provided by the comparators, and collectively providing the N bit digital word.

25. A tablet press according to claim 24 comprising histogram means for providing a substantially histogram-like representation of the values represented by the data words, the histogram-like representation having N class intervals bounded by the pre-established limits, the tablet press further comprising means for displaying the histogram-like representation.

26. A tablet press according to claim 22 wherein the data processing means computes an average value of the data words stored by the data processing means, the pre-established limits comprise upper and lower alert limits, and the press control signals comprise powder fill adjust signals, the tablet press further comprising:

(a) proximity means for generating a third signal indicative of the completion of a full rotation of the press, the data processing means being responsive to the third signal to compare the average value to the upper and lower alert limits and to provide the powder fill adjust signals when the average value exceeds the upper alert limit and when the average value fails to exceed the lower alert limit;

(b) fill adjust means responsive to the powder fill adjust signals to increase the quantity of the powder fill in the dies when the average value fails to exceed the lower alert limit and to decrease the quantity of the powder fill in the dies when the average value exceeds the upper alert limit.

27. A tablet press according to claim 26 wherein the pre-established limits further comprise upper and lower alarm limits, the upper alarm limit being greater than the upper alert limit and the lower alarm limit being less than the lower alert limit, and the press control signals further comprise a divert pulse, the data processing means being responsive to provide the divert pulse when the data processing means detects that the value of any of the data words has exceeded the upper alarm limit or has failed to exceed the lower alarm limit, the tablet press being responsive to the divert pulse to actuate a divert gate for diverting one or more tablets.

28. A tablet press according to claim 27 wherein the press control signals further comprise a first user selectable control signal and the data processing means comprises means for maintaining a count of the number of times that the value of one or more data words has exceeded the upper alarm limit and has failed to exceed the lower alarm limit and providing the first user selectable control signal when the count reaches a pre-established maximum count for affecting the operation of the press in a predefined manner.

29. A tablet press according to claim 28 further including a plurality of interlock signals, each interlock signal being changeable between first and second states in response to the occurrence of an undesirable event such as an increase in operating temperature of the press, the data processing means being responsive to the change of state of any of the interlock signals to provide a second user selectable control signal for affecting the operation of the press in a predefined manner.

30. A tablet press according to claim 29 further comprising:

(a) means for providing a third user selectable control signal for affecting the operation of the press in a predefined manner, the third user selectable control signal being provided by the data processing means when a predetermined number of tablets have been manufactured by the press;

(b) means for displaying the number of tablets which have been mannufactured when the third user selectable control signal is provided.

31. A tablet press according to claim 26 wherein the means for generating the second signal for indicating that a die/punch combination has begun to exit the compression station and is no longer in the maximum compression zone comprises a first proximity probe mounted a distance from the maximum compression zone of the compression station, the first proximity probe providing the second signal whenever a die/punch combination passes the first proximity probe.

32. A tablet press according to claim 31 wherein the proximity means for generating a third signal indicative of the completion of a full rotation of the press comprises a metal tag mounted on the press and rotating therewith and a second proximity probe, the second proximity probe providing the third signal when the metal tag passes the second proximity probe.

33. A tablet press according to claim 26 wherein the powder fill adjust signals comprise pulses of programmable pulse width, the fill adjust means being responsive to the pulses to incrementally increase or decrease the quantity of the powder fill by an amount corresponding to the pulse width during each rotation of the press until the average value falls mid-way between the pre-established limits.

34. A tablet press according to claim 27 wherein the divert gate is located a distance on the downstream side of the compression station, the data processing means providing a time delay between the time the data processing mean detects that the value of the data word has exceeded the upper alarm limit or has failed to exceed the lower alarm limit and the time the divert pulse is provided, the time delay substantially corresponding to the time required for a pre-established number of die/punch combinations to travel from the compression station to the divert gate.

35. A tablet press according to claim 30 further comprising real time clock means communicating with the data procesing means for providing and displaying the time when the manufacture of a batch of tablets has been completed.

36. A tablet press according to claim 26 further comprising punch bypass means for indicating to the data processing means that data words corresponding to selected ones of the die/punch combinations should not be processed.

37. A tablet controller according to claim 26 wherein the data processing means is a microprocessor operating according to a control algorithm and the second signal is an interrupt signal.

38. A method of controlling the operation of a tablet press of the type having a plurality of die/punch combinations moveable through a compression station for applying a compression force to a quantity of powder fill in each die, the compression station having a zone where a maximum compression force is applied, the method comprising:

(a) providing a compression signal having a substantially sinusoidal waveform, the magnitude of the compression signal at any time being an indication of the magnitude of the compression force at that time, the compression signal having a peak magnitude indicative of the magnitude of the maximum compression force;

(b) providing a proximity signal for indicating that one of the die/punch combinations is exiting the compression station and is no longer in the maximum compression zone, the proximity signal being an indication that the maximum compression force has been applied;

(c) monitoring the compression signal and continuously providing, during at least the positive going portion of the sinusoid, a data word having a value indicative of the magnitude of the compression signal, the value of the data word increasing by an incremental amount when the magnitude of the compression signal has increased by a corresponding incremental amount;

(d) holding in a memory circuit the highest value the data word achieves;

(e) reading the data word held in the memory circuit when the proximity signal occurs;

(f) processing the data word and providing press control signals for controlling the operation of the press.

39. A method according to claim 38 wherein the tablet press is a rotary press, further comprising:

(a) providing first and second pre-established limits;

(b) providing a synchronizing signal when the press has completed a full rotation;

(c) computing, in response to the occurrence of the synchronizing signal, the average value of all data words provided during the previous full rotation of the press;

(d) comparing the average value to the first and second pre-established limits and providing signals to adjust the quantity of powder fill in the dies when the average value exceeds either of the first or second pre-established limits.

40. A method according to claim 39 further comprising:

(a) providing a pulse of programmable pulse width when the average value exceeds the pre-established limits;

(b) incrementally adjusting the quantity of the powder fill in the dies by an amount corresponding to the pulse width during each rotation of the press until the average value falls mid-way between the pre-established limits.

41. A method according to claim 40 wherein the tablet press includes a divert gate for diverting bad tablets from a stream of good tablets, the divert gate being located on the downstream side of the compression station by a distance substantially corresponding to a number of die/punch combinations, the method further comprising:

(a) providing an indication of the number of die/punch combinations between the compression station and the divert gate to the data processing means;

(b) providing third and fourth pre-established limits;

(c) determining when the value of any of the data words falls outside either of the third or fourth pre-established limits;

(d) keeping track of the number of die/punch combinations passing through the compression station;

(e) providing the divert signal when the value of any data word falls outside either of the third or fourth pre-established limits after the number of die/punch combinations provided in step (a) has passed through the compression station.

42. A method according to claim 38 wherein the step of monitoring the compression signal and continuously providing the data word comprises classifying the compression signal into one or more of N successive categories, where N is an integer greater than 2, each successive category being assigned a successively increasing value, the number of categories into which the compression signal is classified being an indication of the magnitude of the compression signal, the highest category into which the compression signal is classified being an indication of the peak magnitude of the compression signal, the data word held by the memory circuit being a N bit digital word indicative of the highest category into which the compression signal has been classified.

43. A method according to claim 42 further comprising providing a substantially histogram-like representation of the values of the data words, the histogram-like representation having N class intervals.

44. A controller for a rotary tablet press having a plurality of die/punch combinations rotatable through at least one compression station for applying a compression force to a quantity of powder fill placed in each die, the compression station having a zone where a maximum compression force is applied, the tablet press providing a substantially sinusoidal compression signal having a magnitude continuously indicative of the magnitude of the compression force, the compression signal having a peak magnitude indicative of the magnitude of the maximum compression force, the controller comprising:

(a) classification means for classifying the compression signal into one or more of N successive categories, where N is an integer greater than 2, each successive category being assigned a successively increasing value, the classification means classifying the compression signal during at least the positive going portion of the sinusoid, the number of categories into which the compression signal is classified at any time being an indication of the magnitude of the compression signal at that time, the highest category into which the compression signal is classified being an indication of the peak magnitude of the compression signal, the classification means providing a N bit data word indicative of the highest category into which the compression signal has been classified;

(b) first proximity probe input means for receiving a signal from a first proximity probe located a distance from the maximum compression zone of the compression station, the occurrence of the first proximity signal being an indication that one of the die/punch combinations has begun to exit the compression station and is no longer in the maximum compression zone and therefore being an indication that the maximum compression force has occurred;

(c) second proximity probe input means for receiving a signal from a second proximity probe, the signal from the second proximity probe occurring when the press has completed a full rotation;

(d) data processing means responsive to the first proximity probe signal for reading the data word provided by the classification mean each time the first proximity signal occurs, the data processing means being further responsive to the first proximity signal to compare the value of the data word to pre-established upper and lower alarm limits and provide a divert signal when the value of the data word has exceeded the upper alarm limit or has failed to exceed the lower alarm limit, the divert signal actuating a divert gate associated with the press for separating bad tablets from a stream of good tablets, the data processing means being responsive to the second proximity signal for:

(i) computing the average value of all data words provided by the classification means during the preceding full rotation of the press;

(ii) comparing the average value to pre-established upper and lower alert limits, the upper alert limit being less than the upper alarm limit and the lower alert limit being greater than the lower alarm limit; and (iii) providing powder fill adjust signals when the average value has exceeded the upper alert limit and when the average value has failed to exceed the lower alert limit, the powder fill adjust signals actuating a fill adjust mechanism associated with the press for altering the quantity of powder fill in the dies, the powder fill adjust signals being provided during each rotation of the press until the average value falls mid-way betwen the alarm limits.

(e) means associated with the data processing means for keeping track of the number of tablets which have been manufactured and providing first user selectable control signal for affecting the operation of the press in a predefined manner when the number of tablets manufactured reaches a predetermined number;

(f) means associated with the data processing means for maintaining a count of the number of times that the value of the data words exceed the upper alarm limit and fail to exceed the lower alarm limit and providing a second user selectable control signal for affecting the operation of the press in a predefined manner when the count reaches a predetermined count;

(g) means responsive to the occurrence of one or more external events, such as a rise in operating temperature of the press for providing the second user selectable control signal for affecting the operation of the press in a predefined manner.

45. A controller according to claim 44 wherein the data processing means further comprises means for generating a histogram-like representation of the values of the data words provided by the classification means during the preceding full revolution of the press, the histogram-like representation having N class intervals bonded by the upper and lower alarm limits into which the values of the data words are classified.

46. In a tablet press having compression force means for applying a compression force to a quantity of powder fill, the compression force having a magnitude which varies with changes in the quantity of powder fill, the tablet press including a controller associated therewith, the controller having adjustable upper and lower thresholds defining an acceptable range of compression forces, the controller calculating and displaying an average value indicative of the average compression force, the average value being relative to the upper and lower thresholds, a method of setting the upper and lower thresholds comprising:

(a) providing a desired weight of tablets to be manufactured by the tablet press;

(b) operating the tablet press so that tablets are manufactured;

(c) weighing a number of the tablets and computing the average weight thereof;

(d) adjusting the quantity of powder fill if the average weight computed in step (c) is substantially different from the desired weight provided in step (a);

(e) repeating steps (c) and (d) until the average weight computed in step (c) is substantially the same as the desired weight provided in step (a) and then recording the average weight as a first average weight;

(f) recording the average value displayed by the controller as a first average value;

(g) adjusting the quantity of the powder fill by an incremental amount;

(h) weighing a number of tablets manufactured by the press after step (g) has been performed, computing the average weight thereof and recording the average weight as a second average weight;

(i) recording the average value displayed by the controller as a second average value;

(j) subtracting the first average weight from the second average weight and recording the absolute value of the difference thereof as a first difference;

(k) subtracting the first average value from the second average value and recording the absolute value of the difference thereof as a second difference;

(l) dividing the first difference by the second difference and recording the quotient thereof as a constant;

(m) providing an upper tolerance representing the maximum weight which an acceptable tablet may weigh and a lower tolerance representing the minimum weight which an acceptable tablet may weigh;

(n) dividing the upper tolerance by the constant, the quotient thereof being the value of the upper threshold;

(o) dividing the lower tolerance by the constant, the quotient thereof being the value of the lower threshold; and (p) adjusting the upper and lower thresholds to correspond to the quotients obtained in steps (n) and (o) respectively.

* * * * *